US012807626B2

(12) United States Patent
Jilek et al.

(10) Patent No.: US 12,807,626 B2
(45) Date of Patent: Nov. 24, 2026

(54) DIRECT SYNTHESIS OF ORGANOTIN ALKOXIDES

(71) Applicant: Inpria Corporation, Corvallis, OR (US)

(72) Inventors: Robert E. Jilek, Philomath, OR (US); Christopher J. Reed, Corvallis, OR (US); Bryan T. Novas, Philomath, OR (US)

(73) Assignee: Inpria Corporation, Corvallis, OR (US)

( * ) Notice: Subject to any disclaimer, the term of this patent is extended or adjusted under 35 U.S.C. 154(b) by 530 days.

(21) Appl. No.: 18/525,244

(22) Filed: Nov. 30, 2023

(65) Prior Publication Data

US 2024/0199658 A1 Jun. 20, 2024

Related U.S. Application Data

(60) Provisional application No. 63/429,261, filed on Dec. 1, 2022.

(51) Int. Cl.

*C07F 7/22* (2006.01)
*B01J 31/02* (2006.01)
*B01J 35/39* (2024.01)

(52) U.S. Cl.

CPC ......... *C07F 7/2224* (2013.01); *B01J 31/0279* (2013.01); *B01J 35/39* (2024.01); *C07F 7/2296* (2013.01); *B01J 2231/44* (2013.01)

(58) Field of Classification Search

CPC B01J 2231/44; B01J 31/0239; B01J 31/0279; B01J 35/39; C07F 7/2224; C07F 7/2296
See application file for complete search history.

(56) References Cited

U.S. PATENT DOCUMENTS

| | | | |
|---|---|---|---|
| 9,310,684 | B2 | 4/2016 | Meyers et al. |
| 10,228,618 | B2 | 3/2019 | Meyers et al. |
| 10,642,153 | B2 | 5/2020 | Meyers et al. |
| 11,073,761 | B2 | 7/2021 | Moon et al. |
| 2020/0241413 | A1 | 7/2020 | Clark et al. |
| 2020/0326627 | A1 | 10/2020 | Jiang et al. |
| 2022/0002323 | A1 | 1/2022 | Ermert et al. |
| 2022/0064192 | A1 | 3/2022 | Edson et al. |
| 2023/0143592 | A1 | 5/2023 | Jiang et al. |
| 2023/0334488 | A1 | 10/2023 | Reineke et al. |

FOREIGN PATENT DOCUMENTS

| | | | |
|---|---|---|---|
| KR | 10-2020-0014216 | A | 2/2020 |
| WO | 2019-217749 | A1 | 11/2019 |
| WO | 2019-246254 | A1 | 12/2019 |
| WO | 2020-0264158 | A | 12/2020 |
| WO | 2022-046736 | A1 | 3/2022 |
| WO | 2023-245047 | A1 | 12/2023 |

OTHER PUBLICATIONS

Kennedy (Auto-association in Organometallic Compounds : A Nuclear Magnetic Double Resonance Study of Methyl- and n-Butyltin Alkoxides, J.C.S. Perkin II, Issue 2, pp. 242-248, Published 1977) (Year: 1977).*
Fieldberg et al., "Chemistry of bulky alkoxides of bivalent germanium and tin; structures of gaseous[Sn(OBut)2]2 and crystalline Ge(OCBut3)2", Journal of the Chemical Society, Chemical Communications, Issue 14, p. 939-941, (1985), Abstract, four pages.
Veith et al., "Alkoxistannate.—II : Tri(tert-Butoxi)alkalistannate(II) : Darstellung und Strukturen", Zeitschrift für Naturforschung / B-41, p. 1071-1080, (1986). (English Abstract).
Gaur et al., "Organic Derivatives in tin V. Synthesis and reactions of alkyltin trialkoxides", Journal of Organometallic Chemistry, vol. 63 No. 16, p. 221-231, (Dec. 16, 1973), Summary, three pages.
International Search Report from corresponding Patent Application No. PCT/US2023/081820 dated Apr. 9, 2024.

* cited by examiner

*Primary Examiner* — Andrew D Kosar
*Assistant Examiner* — Blaine G Doletski
(74) *Attorney, Agent, or Firm* — Christensen, Fonder, Dardi, Busse; Diane E. Bennett; Peter S. Dardi

(57) ABSTRACT

Synthesis techniques are described for forming organotin trialkoxide compounds via direct alkylation of tin alkoxides. A first method involves reacting an alkali metal tin trialkoxide with an organohalide compound ($RX_n$, where X is a halide atom and $n \geq 1$) to form a monoorgano tin trialkoxide represented by the formula $R[Sn(OR')_3]_n$. The method can be used to form polytin trialkoxide compounds with a plurality of radiation sensitive C—Sn bonds. R and R' include organo groups and can optionally comprise heteroatoms and/or unsaturated bonds. A second method involves the ultraviolet light-driven reaction of a di-tin tetraalkoxide with an organohalide compound (RX) to form a monoorgano trialkoxide represented by the formula $RSn(OR')_3$. A third method involves the visible or ultraviolet light-driven reaction of a di-tin tetraalkoxide or an alkali metal tin trialkoxide with an fluorinated organohalide compound ($R^FX$) to form a fluorinated monoorgano trialkoxide represented by the formula $R^FSn(OR')_3$. The disclosed methods provide for high mono-organo specificity. Corresponding organotin trialkoxide compositions are also described. The compositions are useful for radiation patterning, especially with EUV radiation. The organotin trialkoxide compositions may be formed as radiation-patternable coatings on substrates.

21 Claims, 12 Drawing Sheets

DIRECT SYNTHESIS OF ORGANOTIN ALKOXIDES

CROSS REFERENCE TO RELATED APPLICATIONS

This application claims priority to copending U.S. provisional patent application 63/429,261 filed Dec. 1, 2022 to Jilek et al., entitled "Direct Synthesis of Organotin Alkoxides," incorporated herein by reference.

FIELD OF THE INVENTION

The invention relates to versatile synthesis methods for forming organotin trialkoxide compounds involving the direct alkylation of tin alkoxides that avoid hydrolysable ligand replacement. The synthesis methods involve the use of an alkali metal tin trialkoxide or a di-tin tetraalkoxide starting material, which both exemplify a high mono-organo specificity. The invention further relates to polytin compounds with bridging organo ligands forming C—Sn bonds to each of the tin atoms.

BACKGROUND OF THE INVENTION

Organometallic compounds provide metal ions in solution and vapor forms for deposition of thin films. Organotin compounds provide high EUV absorption and radiation sensitive tin-ligand bonds that can be used to lithographically pattern thin films. The manufacture of semiconductor devices at ever shrinking dimensions with EUV radiation requires new materials with wide process latitude to achieve required patterning resolutions and low defect densities.

SUMMARY OF THE INVENTION

In one aspect, the invention pertains to a method for synthesizing a monoorgano tin trialkoxide comprises reacting $MSn(OR')_3$ with $RX_n$ to form $R[Sn(OR')_3]_n$, wherein M is Li, Na, K, Rb, or Cs; X is Cl, Br, or I; and $n \geq 1$. R is an organo group with 1 to 31 carbon atoms and forming a C—Sn bond. R' is an organo group with 1 to 10 carbon atoms. The organo groups can optionally comprise hetero-atoms and/or unsaturated bonds.

In another aspect, the invention pertains to a method for synthesizing a monoorgano tin trialkoxide comprising reacting $Sn_2(OR')_4$ with RX under ultraviolet light to form $RSn(OR')_3$, where X is Cl, Br or I. R is an organo group with 1 to 31 carbon atoms and forming a C—Sn bond. R' is an organo group with 1 to 10 carbon atoms. The organo groups can optionally comprise hetero-atoms and/or unsaturated bonds.

In another aspect, the invention pertains to an organometallic compound represented by the formula $((R'O)_3Sn)_n$—R, where $n \geq 3$; R' is an organo group with 1 to 10 carbon atoms; and R is an organo group with 5 to 31 carbon atoms and forms a C—Sn bond with each Sn atom.

In another aspect, the invention pertains to a method for forming a fluorinated organometallic compound represented by the formula $(CF_3)RSn(OR')_3$, where R is an organo group with 1 to 31 carbon atoms and forming a C—Sn bond; and R' is an organo group with 1 to 10 carbon atoms. The method comprises reacting $(CF_3)RX$ with $Sn_2(OR')_4$ or $MSn(OR')_3$ under visible or ultraviolet light where X is Cl, Br or I.

In another aspect, the invention pertains to a fluorinated organometallic compound represented by the formula $(CF_3)_2R^1C$—$R^0Sn(OR')_3$, where $R^0$ is an organo group with 1 to 31 carbon atoms and forming a C—Sn bond; $R^1$ is hydrogen, a halogen atom or an organo group with 1 to 10 carbon atoms; and $R^1$ is an organo group with 1 to 10 carbon atoms.

DETAILED DESCRIPTION OF THE INVENTION

Figure 1:
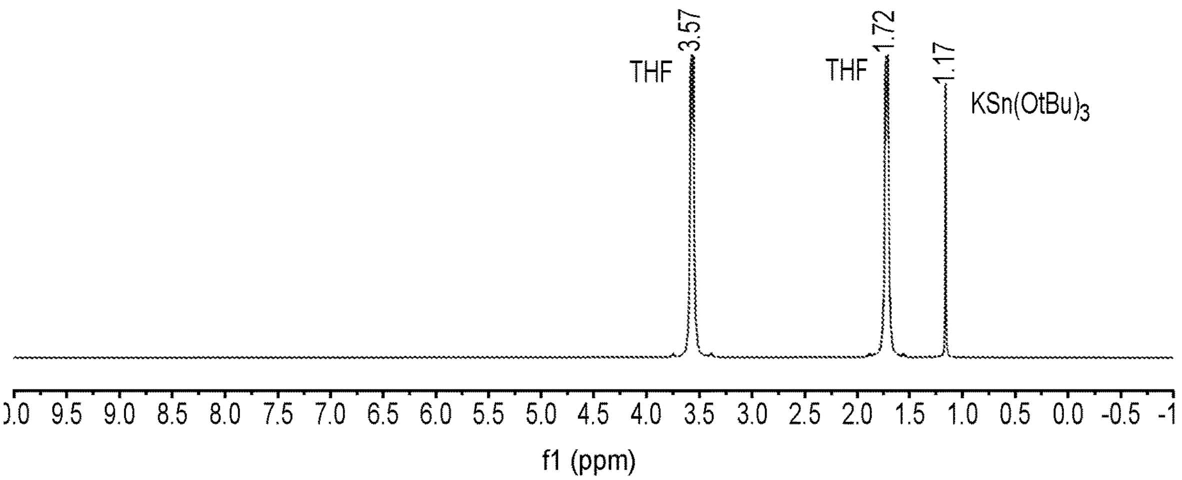
FIG. 1 is a $^1H$ NMR spectrum of $KSn(OtBu)_3$ in THF.

New synthetic routes to organotin trialkoxide compositions have been discovered based on oxidative stannylation starting from Sn(II) alkoxide, and the methods offer high selectivity and efficiency. In some embodiments, the new synthesis methods are based on reaction of tin (II) alkoxide with a potassium alkoxide to form an intermediate bimetallic alkali metal tin trialkoxide, such as potassium tin(II) trialkoxide, composition, followed by subsequent reaction of the intermediate bimetallic composition with an alkyl halide to form a monoalkyltin trialkoxide composition. In other embodiments, effective synthesis methods are based on the reaction of di-tin tetraalkoxide with an organohalide under UV light to directly synthesize the organotin trialkoxide, and tin halide alkoxide by-products are readily separated. The methods described herein can provide for high selectivity and yield and enable the preparation of monoalkyltin trialkoxide compositions without the need to perform ligand exchange or conversion reactions, for example, conversion of a monoalkyltin triamide to a monoalkyltin trialkoxide. The reactions described herein can be useful for preparing monoalkyltin trialkoxides having primary or secondary Sn—C bonds. In some embodiments, an organo group, such as an aromatic group, can be a bridging organic ligand with direct C—Sn bonds to a plurality of Sn atoms, such as two, three or more tin. Furthermore, the reactions described herein can be useful in preparing organotin compounds with fluorinated organic groups, e.g., $R^FSnL_3$ compounds where $R^F$ is an alkyl group substituted with one or more fluorine atoms, especially with a plurality of trifluoromethyl ($F_3C$—) groups. The resulting organotin trialkoxides can be desirable precursors for radiation based patterning compositions, especially for effective EUV patterning.

As used herein, and as generally consistent with usage in this field, "organotin," "hydrocarbyl tin" and "alkyl tin" terms can be used interchangeably, and likewise "monoalkyl" can be used interchangeably with "monoorgano" or "monohydrocarbyl". The "alkyl" ligands suggest bonding to the tin with carbon (generally $sp^3$ or $sp^2$ hybridized) to form a bond that is generally not hydrolysable through contact with water. The "alkyl" group can also have internal unsaturated bonds and hetero-atoms, i.e., distinct from carbon and hydrogen, that are not involved in bonding with the tin. Similarly, a reference to alkoxide groups refers to group bound at an oxygen atom with an organo substituent on the oxygen. New synthesis methods described herein yield monoalkyl tin trialkoxides in high yield and with low (non-tin) metal and polyalkyl (i.e., polyhydrocarbyl) contaminants following straightforward purification. The synthesis approaches are amenable for efficient scale up for commercial production, and the reactions are straightforward and can be performed as a single pot synthesis.

Organotin compounds, particularly monoalkyltin trialkoxide and triamide compounds, have found use as precursors for high-performance photoresists for EUV lithography. The use of alkyl tin compounds in high performance radiation-based patterning compositions is described, for example, in U.S. Pat. No. 9,310,684 to Meyers et al., entitled "Organometallic Solution Based High Resolution Patterning Compositions," incorporated herein by reference. Refinements of these organometallic compositions for patterning are described in U.S. Pat. No. 10,642,153 to Meyers et al., entitled "Organometallic Solution Based High Resolution Patterning Compositions and Corresponding Methods," and U.S. Pat. No. 10,228,618 to Meyers et al. (hereinafter the '618 patent), entitled "Organotin Oxide Hydroxide Patterning Compositions, Precursors, and Patterning," both of which are incorporated herein by reference.

The compositions synthesized herein can be effective precursors for forming the alkyl tin oxo-hydroxo compositions that are advantageous for high resolution patterning, for example in extreme ultraviolet (EUV), ultraviolet (UV), electron-beam lithography. The alkyl tin precursor compositions comprise a group that can be hydrolyzed with water or other suitable reagent under appropriate conditions to form the monoorgano tin oxo-hydroxo patterning compositions, which, when fully hydrolyzed, can be represented by the formula $RSnO_{(1.5-(x/2))}(OH)_x$ where $0<x\leq3$. It can be convenient to perform the hydrolysis to form the oxo-hydroxo compositions in situ, such as during deposition and/or following initial coating formation. While organo tin triamides and organo tin triacetylides described, for example, in the above-referenced '618 patent, can be used under hydrolyzing conditions for forming radiation sensitive coatings for patterning, it can be desirable to use organo tin trialkoxides as part of the film-forming compositions. Direct synthesis of organo tin trialkoxides are described herein.

Monoorgano tin compositions can generally be represented by the formula $RSnL_3$, where R is an alkyl group and L is a hydrolysable ligand. For processing to form radiation patternable coatings, L is generally hydrolysed before or during (e.g., in-situ) deposition to result in a coating comprising a polymeric organotin oxo-hydroxo composition on a substrate wherein the Sn—R bonds remain substantially intact. As a result, a radiation patternable coating having radiation-sensitive Sn—R (Sn—C) bonds can be realized.

The new syntheses described herein are advantageous for efficient formation of R—Sn bonds with a wide selection of R groups having heteroatom(s) that can offer improvements in thermal and/or photosensitivity over R groups having non-substituted alkyl groups. While not wanting to be limited by theory, it is generally believed that the presence of R ligands hinders extended network formation and condensing of the organotin film, and irradiation of the material can result in the cleavage of Sn—C bonds which, in turn, allows for subsequent processing to condense and/or densify the film.

At the time of radiation patterning, hydrolysable ligands have generally been substantially removed to form the ultimate patterning composition from the precursor compositions. In general, organometallic radiation sensitive resists have been developed based on organo tin compositions, such as alkyltin oxide hydroxide, approximately represented by the formula $R_zSnO_{(2-z/2-x/2)}(OH)_x$, where $0<x<3$, $0<z\leq2$, $x+z\leq4$, and R is a hydrocarbyl or organo group forming a carbon bond with the tin atom. Particularly effective forms of these compositions are mono-organotin oxide hydroxide, in which z=1 in the above formula, and the mono-organotin compositions are the focus herein. In particular, R can be a moiety with 1-31 carbon atoms with one or more carbon atoms optionally substituted with one of more heteroatom functional groups, such as groups containing O, N, Si, Ge, Sn, Te, and/or halogen atoms, or an alkyl, or a cycloalkyl further functionalized with a phenyl, or cyano group. In some embodiments, R can comprise ≤10 carbon atoms and can be, for example, methyl, ethyl, propyl, isopropyl, butyl, t-butyl, isobutyl, or t-amyl. The R group can be a linear, branched, (i.e., secondary or tertiary at the metal-bonded carbon atom), or cyclic hydrocarbyl group. Each R group individually and generally has from 1 to 31 carbon atoms with 3 to 31 carbon atoms for the group with a secondary-bonded carbon atom and 4 to 31 carbon atoms for the group with a tertiary-bonded carbon atom, optionally with unsaturated or aromatic carbon bonds. In particular, branched alkyl ligands can be desirable for some patterning compositions. The formation of the oxo-hydroxo coating material can comprise deposition of a tin composition with hydrolysable bonds, such as $RSnL_3$, where L is a hydrolysable ligand, such as an alkoxide, a dialkyl amine, an acetylide or other suitable hydrolysable ligand. The hydrolysable ligands can be hydrolyzed to form the oxo-hydroxo network during deposition of the coating and/or in the coating following deposition, i.e., completing the hydrolysis after deposition. Applicant has developed methodologies to efficiently and effectively form a wide range of patterning compositions with different R groups, optionally with various hetero atoms, with C—Sn bonds, as described further in published U.S. patent application 2022/00064192 to Edson et al., entitled "Methods to Produce Organotin Compositions With Convenient Ligand Providing Reactants," incorporated herein by reference.

The stability of the Sn—C bond can generally depend on the substitution of the alpha carbon (the C bound to the Sn), and the stability generally increases as the alpha carbon substitution decreases. For example, Sn—R bonds with primary alpha carbons are generally more stable than secondary alpha carbons which are in turn more stable than tertiary alpha carbons. Also, some unsaturated alpha carbons, such as an alkynyl C bound to Sn (e.g., Sn—C≡C), may hydrolyze during processing, so they may not be suitable for reliance on their radiation sensitivity. Stability of Sn—C bonds can correlate with dose sensitivity and/or thermal stability such that lower stability Sn—C bonds require less energy to cleave, and therefore may be expected to correlate with lower doses needed to form a pattern. Additionally, thermal stability of the Sn—C bonds can depend on alpha carbon substitution in the same way where increasing substitution of the alpha carbon can lead to generally undesirable tradeoffs between lower thermal stability and higher dose sensitivity. It is therefore desirable for new organotin compositions to have both high thermal stability and high dose sensitivity.

Processing of the organotin precursor compositions to afford organotin oxo-hydroxo coatings generally involves hydrolysis of the $RSnL_3$ composition(s) to afford the related organotin oxo-hydroxo composition(s). Hydrolysis can be performed prior to the deposition process to yield soluble organotin oxo-hydroxo species (i.e., clusters, oligomeric species, etc.) These soluble organotin oxo-hydroxo species can then be dissolved and/or dispersed into a suitable solvent to form an organotin photoresist solution that can then be used to form radiation-patternable organotin oxo-hydroxo coatings. Alternatively, the organotin precursor compositions can be directly dissolved in a suitable solvent to form a photoresist solution that can then be used to form radiation-patternable organotin oxo-hydroxo coatings. The organotin compositions can also be hydrolysed in-situ with water, which can be ambient water vapor, during the substrate coating process, such as during solution deposition or during vapor deposition. Various processing options are described further in the '684 and '618 patents referenced above.

For organotin photoresist precursor compositions wherein the organotin compound(s) dissolved into a solvent for spin-coating, organotin trialkoxides ($RSnL_3$, L=OR') can be desirable for use over other $RSnL_3$ compositions (e.g, organotin triamides, $L=NR'_2$). Some advantages to organotin trialkoxide compositions are, for example, the production of more benign side-products, e.g., alcohols, that are relatively innocuous compared to the production of gaseous products (e.g., amines) which may cause contamination, environmental health and safety (EHS), and similar concerns within the wafer track and/or wafer fab. Organotin trialkoxides also possess appreciable vapor pressures and low melting points which makes them attractive compounds for use in vapor deposition methods to prepare radiation patternable coatings.

Synthesis of organotin trialkoxide compounds have been previously described, such as in previous patent applications by Applicant. However, these reactions offering monoalkyltin trialkoxides as products generally involve conversion of a non-alkoxide alkyl tin compound into an alkyl tin alkoxide rather than a direct synthesis. In other words, organotin trialkoxides have generally been synthesized through ligand replacement reactions. For example, organotin trialkoxides can be prepared from the corresponding organotin trichlorides by reaction with an alkali metal alkoxide, e.g., KOR', NaOR', and the like, according to the following reaction:

$$RSnCl_3+3MOR'\rightarrow RSn(OR')_3+3MCl, \quad (1)$$

Using this synthetic scheme, the potential product space for organotin trialkoxides therefore has practical constraints based on the access to and purity of the corresponding organotin trichloride. Organotin trichlorides are generally synthesized through the well-known Kocheskov Reaction where a tetraalkyl tin, $R_4Sn$, serves as a starting material for the synthesis of other organotin halides that are generated through redistribution reaction with $SnCl_4$. This reaction is known to be non-selective and highly sensitive to stoichiometry, and generally results in some distribution of off-target and undesired $R_nSnCl_{4-n}$ products. For example, to synthesize $RSnCl_3$, a mixture of $SnCl_4$ and $R_4Sn$ are reacted in a 3 to 1 ratio to target $RSnCl_3$ as the major product, but the reaction produces significant amounts of $R_2SnCl_2$ and $R_3SnCl$ as side products. For semiconductor applications where high purity compounds are required for low defect processing and for commercial viability, one or more purification steps can be necessary to further purify and/or isolate the $RSnCl_3$ compound prior to its conversion to a trialkoxide, and the purification itself can involve significant effort. The synthetic methods described herein alleviate the need for a high-purity organotin trichloride starting material in the synthesis of an organotin trialkoxide.

Other methods of preparing organotin trialkoxides involve conversion of an organotin triamide to an organotin trialkoxide via the following reaction:

$$RSn(NR_2'')_3+3HOR'\rightarrow RSn(OR')_3+3HNR''_2. \quad (2)$$

While this reaction is relatively straightforward, application of the method can be constrained by factors such as it being exothermic and can potentially lead to decomposition of the reactants and/or products, and high cost because of the necessity of first synthesizing the corresponding organotin triamide. While Applicant has previously described synthesis techniques for preparation of a wide variety of organotin triamides, there remains a desire for access to methods to directly synthesize organotin trialkoxides without the need to first obtain an organotin starting material with the desired R ligand identity. A direct synthesis of a target organotin trialkoxide, $RSn(OR')_3$, is desirable and is described herein.

Direct Synthesis of Organotin Trialkoxides

Two related synthesis techniques are described for the direct synthesis of organo tin trialkoxides. As exemplified, both methods involve the reaction of an organohalide, such as an alkyl halide (RX), with a tin alkoxide compound to form a Sn—R bond. The tin alkoxide can be a di-tin tetraalkoxide ($Sn_2(OR')_4$) or an alkali metal tin alkoxide, e.g., $MSn(OR')_3$. In a first approach, the di-tin tertaalkoxides are reacted with an organohalide, generally in the presence of UV or monochromatic visible light, to form a monoalkyl tin trialkoxide, $RSn(OR')_3$. In a second approach, the alkali metal tin trialkoxide is reacted with an organohalide to form the corresponding organo tin trialkoxide with low tin contaminant production.

The di-tin tetralkoxide ($Sn_2(OR')_4$) and alkali metal tin alkoxide ($MSn(OR')_3$) can be prepared using methods known in literature, for example, in an article by Veith et al. (hereinafter the Veith article), entitled "Alkoxistannate, II Tri(rerr-butoxi)alkalistannates(II): Synthesis and Structures," Z. Naturforsch. 41b, 1071-1080 (1986), incorporated herein by reference. The Veith article does not suggest specific reactions using $Sn_2(OR')_4$ or $MSn(OtBu)_3$ as a further reactants to form alkyltin trialkoxides, e.g., $RSn(OtBu)_3$. The Veith article discloses the synthesis of $MSn(OtBu)_3$ using $Sn_2(O^tBu)_4$. As exemplified herein, $MSn(OtBu)_3$ is synthesized in a two-step reaction from $SnCl_2$ and M(OtBu). After the first step, precipitated MCl (KCl) removed, but no further purification is needed.

As descried herein and in the Examples below, monoalkyltin trialkoxides can be synthesized by the following overall reaction:

$$MSn(OR')_3+RX \rightarrow RSn(OR')_3, \quad (3)$$

where M is generally an alkali metal, such as Li, K, Na, Cs, or Rb. R' is generally an organo group with ≤10 carbon atoms, and OR' can generally be selected for desirable properties of the product monoalkyltin trialkoxide, $RSn(OR')_3$, such as stability, melting point, solubility, case of purification, and so forth. In some embodiments, M is K. In some embodiments, OR' is tert-butoxide (OtBu). In some embodiments, OR' is tert-amyloxide (OtAm). The RX compounds are selected to provide the desired organo ligands, R, for the mono-organotin products. The wide availability of RX compounds as reactants as well as the broad reactivity of the compounds in the corresponding reaction provides an ability to introduce a wide range of alkyl ligands into the product monoalkyl tin products. X can generally be a halide chosen from I, Br, or Cl.

The reaction of Eq. (3) can be generalized for the synthesis of poly-tin products with bridging organo ligands, $$n\ MSn(OR')_3+RX_n \rightarrow R(Sn(OR')_3)_n, \quad (4)$$

where n≥1, such as 1, 2, 3, 4, or more than 4 and M is generally an alkali metal as described above. In general, as long as reasonable polyhalide reactants are available, there are not clear limits on the number of tin atoms that can be bridged in this way. In some embodiments, n can be from 2 to about 12. R, X and R' are as specified in the previous paragraph. For the mono-tin or poly-tin embodiments, a plurality of different R' groups can be used if desired.

For the reactions described herein, primary and secondary R groups (i.e., R groups that have a 1° or 2° C. atom that forms the C—Sn bond) can be particularly effective at forming the desired $RSn(OR')_3$ compositions via the synthetic routes described herein. In general, R ligands are organo ligands with 1-31 carbon atoms with one or more carbon atoms optionally substituted with one of more heteroatom functional groups containing O, N, Si, and/or halogen atoms or an alkyl or a cycloalkyl further functionalized with a phenyl or cyano group with optional unsaturated carbon-carbon or heteroatom bonds. In particular, olefinic R ligands having unsaturated carbon bonds can also be prepared, such as R ligands having one or more C═C bonds, as shown in the examples herein. Additionally, poly-tin compounds having two, three or more Sn atoms bridged by a shared R group can also be prepared via the new synthetic methods described herein using polyhalide reactants. In some embodiments, it can be desirable for a catalyst to be present during the reaction to form the monoalkyltin trialkoxide, as described further below.

In some embodiments, the R ligands can comprise heteroatom functional groups containing O, N, Si, and/or halogen atoms. In some embodiments, the R ligands are fluorinated. Fluorine atoms can be desirable to substitute for H atoms within the R ligands due to their higher EUV absorption. Additionally, the presence of F atoms within the R ligand can increase the hydrophobicity of the ligand, thus improving the developer contrast between irradiated and non-irradiated areas of the film.

In some embodiments, the fluorinated R ligands can comprise 2 to 10 carbon atoms and two or more $—CF_3$ groups, such as in the hexafluorobutyl (HFB) compound described in the Examples herein. In some embodiments, the R ligands can comprise a tertiary carbon having a C—F bond, e.g. $—CFR_2$ wherein R is a hydrocarbyl group having 1 to 10 carbon atoms, such as in the HFP compound described in the Examples herein.

In some embodiments, the R ligands can comprise bridging hydrocarbyl groups shared between two, three or more Sn atoms. The bridging R ligands can generally include lincar, branched, cyclic, and/or aromatic hydrocarbyl groups having from 1 to 31 carbon atoms.

The alkali tin trialkoxide intermediate, $MSn(OR')_3$, a bimetallic alkoxide of Sn(II), has been discovered to be a useful reagent for forming organotin trialkoxides, and can be prepared according to the following reaction:

$$SnCl_2+3MOR' \rightarrow MSn(OR')_3+2MCl. \quad (4)$$

The alkali metal M can generally be chosen from Li, Na, K, Cs, or Rb. In some embodiments, M is K. In some embodiments, M is Li or Na. The $MSn(OR')_3$ compound can be isolated, purified, and used as a solid reagent in the syntheses, and its preparation is included in the Examples herein. When reacted with an organohalide at modest temperatures and conditions, an oxidative addition reaction can occur wherein a carbon tin bond is formed with rapid formation of potassium halide and $RSn(OR')_3$. As exemplified below, the reaction is performed in two steps with 2 equivalents of MOR' added first to precipitate the MCl, which can then be removed. A further amount of MOR' is added, and a somewhat less than an equivalent can be added in view of losses from the filtering for removal of the precipitated MCl. Generally, the precipitated alkali halide, such as potassium halide, salt can be alternatively filtered away, and/or the $RSn(OR')_3$ product can be purified and collected, such as via distillation.

For some R groups, such as fluorinated alkyl groups, it has been discovered that the corresponding $R^FSn(OR')_3$ composition can be synthesized without the use of the alkali tin alkoxide composition, i.e., directly from $Sn(OR)_2$ ($[Sn(OR')_2]_2$) in the presence of UV light or visible light according to the following reaction:

$$[Sn(OR')_2]_2+R^FX \rightarrow R^FSn(OR')_3+\tfrac{1}{2}Sn_2X_2(OR')_2, \quad (5)$$

The ditin by-product ($Sn_2X_2(OR')_2$) is generally formed as a solid precipitate, which can be separated by filtration or other suitable technique. While noted as a reaction for fluorinated organo ligands, this reaction can be more generally applied as desired.

In the Examples herein, synthesis of fluorinated alkyltin trialkoxides wherein $R^F$=trifluoroethyl (TFE, $CF_3CH_2—$), R'=tert-butyl, and X=halide (Cl, Br, I) are described. While not wanting to be limited by theory, it is believed that the reaction with fluorinated alkyl groups involves a radical mechanism that can be promoted via irradiation with suitable UV or visible light. Notably, the reaction can be performed under UV or visible irradiation without the presence of a bimetallic tin(II) alkoxide. These reactions can also be performed with alkali metal tin trialkoxides, and these reactions are also facilitated with visible or UV irradiation. Suitable light sources can be used to provide UV and/or visible light to the reaction vessel, for example, LEDs, lasers, bulbs, and the like. The light source can generally provide light with a wavelength from between 200 nm and 700 nm, and it can generally be desirable for the selected wavelength to have sufficient transmission through the reaction vessel(s) (i.e., glassware) to enable sufficient absorption by the species in the reaction medium. In some embodiments, the light source can be monochromatic.

The reactions are generally performed in dry organic solvents under an oxygen free or depleted atmosphere, such as a nitrogen purged atmosphere. Solvents can be selected to result in the solubility of the various components. Due to interactions of the solvent with the metal ions, selection of solvents can be based at least in part on reaction rates in the selected solvents, which can be evaluated empirically. If different solvents are selected, they are generally miscible. Both aprotic polar and non-polar solvents are generally useful, such as alkanes (for example, hexane, pentane), ethers (for example, dimethyl ether, diethyl ether), tetrahydrofuran (THF), acetone, toluene, acetonitrile, and mixtures thereof. The solvents should generally be selected to be inert with respect to the reactants, intermediates, and products. If multiple solvents are used, for example to introduce distinct reactants, the solvents should generally be miscible with respect to each other.

A catalyst comprising a halide can be present during the reaction of the bimetallic $MSn(OR')_3$ compound and the alkylhalide RX compound. The catalyst can generally comprise a tetraalkyl (quaternary) ammonium salt, a tetraalkyl phosphonium salt or a mixture thereof, such as tetrabutylammonium iodide, tetrabutylammonium bromide, tetrabutylammonium hexafluorophosphate, and/or tetraphenylphosphonium chloride. Since the catalyst is not consumed, the amount of catalyst can be selected to influence the reaction rate as desired. Generally, the amount of catalyst is a fraction of a stoichiometric amount.

The reactions using $MSn(OR')_3$ as a starting material can generally be performed in a single pot without any intermediate steps, such as separation, purification, transfer, and the like. Following the reaction between the bimetallic alkoxide $MSn(OR')_3$ and the alkyl halide, the desired organotin alkoxide product can be obtained in pure form via filtration and/or distillation. Using polyhalide organic reactants, bridging organo groups can be formed, $R(Sn(OR')_3)_n$, where n>1, and wherein the organo group, R, has Sn—C bonds to n number of Sn atoms, and a tri-tin product is exemplified.

The reactions described herein are highly selective towards formation of a mono-organo tin trialkoxide compound, and the organohalide can generally be present as a reactant in a molar excess of the $MSn(OR')_3$ composition. But for the formation of poly-tin product with bridging ligands, then a stoichiometric amount of the polyhalide organo reactant can be used. Similarly, for the reactions involving the $Sn_2(OR')_4$ for the direct formation of the organotin trialkoxide indicated in Eq. (5) above, this reaction is also very specific for the mono-organo products. In some embodiments, the organohalide can be present up to about 2 mol. equivalents to the $MSn(OR')_3$ (or $Sn_2(OR')_4$) compound, up to about 1.6 mol. equivalents to the $MSn(OR')_3$ (or $Sn_2(OR')_4$) compound in other embodiments, up to about 1.3 mol. equivalents $MSn(OR')_3$ (or $Sn_2(OR')_4$) compound in other embodiments, and up to about 1.1 mol. equivalents to the $MSn(OR')_3$ (or $Sn_2(OR')_4$) compound in further embodiments. In some embodiments, the organohalide and the $MSn(OR')_3$ (or $Sn_2(OR')_4$) compound can be present in roughly stoichiometric amounts. Note with the reactions based on $Sn_2(OR')_4$, the generation of an Sn by-product that is removed results in a limit of 50% yield based on tin, which is not a constraint for the reactions involving $MSn(OR')_3$ reactant. A person of ordinary skill in the art will recognize that additional ranges of relative reactant amounts within the explicit ranges above are contemplated and are within the present disclosure.

In some embodiments, the reactions can generally be performed at temperatures less than about 100° C., less than about 80° C. in other embodiments, and less than 60° C. in further embodiments. In some embodiments, the reactions can be performed at room temperature. In some embodiments, the reaction can be performed under UV irradiation. In embodiments wherein UV irradiation is performed during reaction, the reaction may or may not be heated. In some embodiments, the reaction can be cooled and performed at temperatures from about −80° C. to about −60° C., from about −60° C. to about −40° C. in some embodiments, from about −40° C. to about −20° C. in other embodiments, and from about −20° C. to about 20° C. in other embodiments. In some embodiments, the UV irradiation can be conducted with a wavelength of 365 nm. In some embodiments, the UV irradiation can be conducted with a wavelength on 254 nm. In some embodiments, the reaction can be performed under monochromatic visible irradiation. The irradiation provided during the reaction can generally be performed at a wavelength suitably transparent to the reaction apparatus (e.g., glassware, vessels, etc.) such that appreciable absorption can occur to drive the reaction. The reactions are generally stirred for the duration of the reaction. Efficacy of the reaction can be monitored by analyzing the reaction mixture via $^1H$ and/or $^{119}Sn$ NMR to determine when the reaction has reached sufficient completion. In some embodiments, the reactions can be performed for about 5 days, for about 3 days in other embodiments, for about 1 day in other embodiments, and for about 1 hour in further embodiments. A person of ordinary skill in the art will recognize that additional ranges of time and temperature within the explicit ranges above are contemplated and are within the present disclosure. Desirable reaction times and temperatures can generally depend on the identity of the organohalide (RX). Reactivity of the organohalide generally follows in the order of X=I>Br>Cl, and in the order of the carbon forming the C—X bond as 1°>2°>>3°. Suitable reaction times and temperatures can be determined through routine experimentation based on the teachings herein. The reactions are generally performed under an inert atmosphere, such as $N_2$ or Ar. A person of ordinary skill in the art will recognize that additional ranges of process conditions within the explicit ranges above are contemplated and are within the present disclosure.

Once the product is formed, the organotin trialkoxides can be purified. The purification depends on the nature of the product, but generally involves the separation of the desired product from by products and potentially any unreacted reagents. Purification can generally be achieved by methods known in the art. Typical means of purification can comprise filtration, recrystallization, extraction, distillation, sublimation, combinations thereof, and the like. Filtration is typically performed on a crude product mixture using commercial filters to remove insoluble contaminants and/or by products, for example, metal halide salts such as KI, from the solution containing the desired product. Recrystallization methods can be useful to purify solid compounds by forming, via heating, a saturated solution that then is allowed to cool. Extraction techniques can comprise, for example, liquid-liquid extractions wherein two non-miscible solvents with different densities are used to separate the desired compounds based on their relative solubilities. Purification can also comprise removal of any volatile compounds including solvents from the product mixture by drying with heat and/or exposure to vacuum. For products with significant vapor pressures, it can be desirable to purify the product through vacuum distillation or, if desired, fractional distillation designed to achieve high purity. See published U.S. patent application 2020/0241413 to Clark et al., entitled "Monoalkyl Tin Trialkoxides and/or Monoalkyl Tin Triamides With Low Metal Contamination and/or Particulate Contamination and Corresponding Methods," incorporated herein by reference. In some cases, products can be purified through sublimation techniques wherein the crude product mixture is heated and/or subject to reduced pressure to result in collection of a solid product that can be purified by sublimation of the solid product, which can be collected by depositing on a target surface, such as a cold finger. Purification of a ditin compound via sublimation is described in the Examples herein.

The organotin trialkoxides, $RSnL_3$ (L=OR'), described herein can be further processed to form corresponding organotin compounds with different hydrolysable ligands, L. In one example, the alkoxide ligands can be replaced with different alkoxide ligands, such as replacing one or more OR' ligands for OR" ligands via solvolysis and/or alcoholysis. The organotin trialkoxides can also be converted to organotin triamides ($RSnL_3$, L=$NR"_2$), such as via reaction of the organotin trialkoxide with $LiNR"_2$ or similar metal amide. In other examples, the alkoxide ligands can be replaced by acetylide, amidinate, carboxylate, and so forth.

The hydrolysable ligand can generally be chosen for handling or use-case considerations, such as for use in a desired mode of processing the $RSnL_3$ composition into a radiation patternable film. For example, while organotin trialkoxides ($RSn(OR')_3$, L=OR') can be desirable for the formation of resist solutions, organotin triamides ($RSn(NR"_2)_3$) can be particularly desirable for use vapor deposition applications because of their generally high vapor pressures and high reactivity. In either case, i.e.,L=OR' or L=NR", the hydrolysis and condensation reactions that occur during the deposition process result in the formation of similar organotin oxide hydroxide film compositions wherein the Sn—C bonds are conserved and Sn—O—Sn and Sn—OH bonds are formed from hydrolysis of the Sn-L bonds.

Coatings, Deposition, and Related Compositions

The organotin precursor compositions described herein can be effectively used for radiation patterning, especially EUV patterning. The ability to have greater flexibility for R ligand selection allows for further improvements in patterning results as well as designing ligands to be particularly effective for specific applications. In general, any suitable coating process can be used to deliver the precursor solution to a substrate. Suitable coating approaches can include, for example, solution deposition techniques such as spin coating, spray coating, dip coating, knife edge coating, printing, such as inkjet printing and screen printing, and the like. Many of the precursors are also suitable for vapor deposition onto a substrate as discussed in the '618 patent cited above. For some R ligand compositions and/or specific process considerations, vapor deposition may be useful for preparation of radiation sensitive coatings.

After preparation of the desired organotin precursor, the precursor can be dissolved in an appropriate solvent to prepare a precursor solution, such as an organic solvent, e.g., alcohols, aromatic and aliphatic hydrocarbons, esters or combinations thereof. In particular, suitable solvents include, for example, aromatic compounds (e.g., xylenes, toluene), ethers (anisole, tetrahydrofuran), esters (propylene glycol monomethyl ether acetate, ethyl acetate, ethyl lactate), alcohols (e.g., 4-methyl-2-pentanol, 1-pentanol, 1-butanol, methanol, isopropyl alcohol, 1-propanol), ketones (e.g., methyl ethyl ketone), mixtures thereof, and the like. In general, organic solvent selection can be influenced by solubility parameters, volatility, flammability, toxicity, viscosity and potential chemical interactions with other processing materials.

The organotin precursor(s) can also generally be dissolved in mixtures of solvents to prepare precursor solutions. Some solvent mixtures useful for forming organotin photoresist solutions have been described in published U.S. Patent Application 2023/0143592 to Jiang et al., entitled "Stability-Enhanced Organotin Photoresist Compositions", incorporated herein by reference. It can be desirable for the organotin precursor(s) to be dissolved in a solvent mixture comprising a primary alcohol. In some embodiments, the solvent can comprise a primary alcohol, such as methanol, ethanol, 1-propanol, 1-butanol, 1-pentanol, 1-hexanol, and the like. In some embodiments, the solvent can comprise a mixture of two alcohols. In other embodiments the solvent can comprise a mixture of an alcohol and an ester. After the components of the solution are dissolved and combined, the character of the species may change as a result of partial in-situ hydrolysis, hydration, and/or condensation.

The organotin precursors can be dissolved in the solvent at concentrations to afford concentrations of Sn suitable for forming coatings of appropriate thickness for processing. The concentrations of the species in the precursor solutions can be selected to achieve desired physical properties of the solution. In particular, lower concentrations overall can result in desirable properties of the solution for certain coating approaches, such as spin coating, that can achieve thinner coatings using reasonable coating parameters. It can be desirable to use thinner coatings to achieve ultrafine patterning as well as to reduce material costs. In general, the concentration can be selected to be appropriate for the selected coating approach. Coating properties are described further below. In general, tin concentrations comprise from about 0.005 M to about 1.4 M, in further embodiments from about 0.02 M to about 1.2 M, and in additional embodiments from about 0.1 M to about 1.0 M. A person of ordinary skill in the art will recognize that additional ranges of tin concentrations within the explicit ranges above are contemplated and are within the present disclosure.

In some embodiments, improved photosensitive precursor compositions can be present in a blended solution with one or more organotin compositions, such as $R_nSnL_{4-n}$ and its hydrolysates, where R is chosen from the various moieties described in detail herein and elaborated on explicitly above. Such blended solutions can be tuned for optimization of various performance considerations, such as solution stability, coating uniformity, and patterning performance. In some embodiments, the improved photosensitive composition can comprise at least 1% by mol. Sn of a desired component in the blended solution, in further embodiments at least 10% by mol. Sn of the blended solution, in further embodiments at least 20% by mol. Sn of the blended solution, and in further embodiments at least 50% by mol. Sn of a specific desired component of the blended solution. Additional ranges of mol % of the improved photosensitive composition within the explicit ranges of the blended solution are contemplated and within the present disclosure. The hydrolysable ligands L can be hydrolyzed during deposition or following deposition, such as through hydrolysis with water vapor.

Owing generally to their high vapor pressures, the organotin compositions described herein can be useful as precursors for forming coatings via vapor deposition. Vapor deposition methods generally include chemical vapor deposition (CVD), physical vapor deposition (PVD), atomic layer deposition (ALD), and modifications thereof. In a typical vapor deposition process, the organotin composition can be reacted with small molecule gas-phase reagents such as $H_2O$, $O_2$, $H_2O_2$, $O_3$, $CH_3OH$, HCOOH, $CH_3COOH$, and the like, which serve as O and H sources for production of radiation sensitive organotin oxide and oxide hydroxide coatings. Water vapor can be provided from ambient air, delivered in vapor form, or otherwise provided in a suitable liquid or vapor composition. Specific apparatuses for vapor deposition of radiation patternable organotin coatings has been described by Wu et. al in PCT Application # PCT/US2019/031618 entitled "Methods for Making EUV Patternable Hard Masks", incorporated herein by reference. Production of radiation sensitive organotin coatings can generally be achieved by reacting the volatile organotin precursor $RSnL_3$ with a small gas-phase molecule. The reactions can include hydrolysis/condensation of the organotin precursor to hydrolyze the hydrolysable ligands while leaving the Sn—C bonds substantially intact. In some embodiments, two or more distinct $RSnL_3$ compounds having different R and/or L ligands can be used to form a final film that comprises a mixture of the RSn species.

Whether deposited by solution deposition or vapor deposition, hydrolysis of the hydrolysable ligands can result in formation of an oxo-hydroxo network represented by $RSnO_xOH_{3-2x}$. Generally, radiation exposure and patterning is performed with the hydrolyzed coating.

With respect to an outline of a representative process for a radiation-based patterning, e.g., an extreme ultraviolet (EUV) lithographic process, photoresist material is deposited or coated as a thin film on a substrate, pre-exposure baked, exposed with a pattern of radiation to create a latent image, post-exposure baked, and then developed with a liquid, typically an organic solvent, to produce a developed pattern of the resist. Fewer steps can be used if desired, and additional steps can be used to remove residue to improve pattern fidelity.

The thickness of the radiation patternable coating can depend on the desired process. For use in single-patterning EUV lithography, coating thicknesses are generally chosen to yield patterns with low defectivity and reproducibility of the patterning. In some embodiments, suitable coating thickness can from between 0.1 nm and 100 nm, in further embodiments from about 1 nm to 50 nm, and in further embodiments from about 2 nm to 25 nm. Those of ordinary skill in the art will understand that additional ranges of coating thickness are contemplated and are within the present disclosure.

Coating thickness for radiation patternable coatings prepared by vapor deposition techniques can generally be controlled through appropriate selection of reaction time or cycles of the process. The thickness of the radiation patternable coating can depend on the desired process. For use in single-patterning EUV lithography, coating thicknesses are generally chosen to yield patterns with low defectivity and reproducibility of the patterning. In some embodiments, suitable coating thickness can from between 0.1 nm and 100 nm, in further embodiments from about 1 nm to 50 nm, and in further embodiments from about 2 nm to 25 nm. Those of ordinary skill in the art will understand that additional ranges of coating thickness are contemplated and are within the present disclosure.

The substrate generally presents a surface onto which the coating material can be deposited, and it may comprise a plurality of layers in which the surface relates to an upper most layer. The substrate is not particularly limited and can comprise any reasonable material such as silicon, silica, other inorganic materials, such as ceramics, and polymer materials.

After deposition and formation of the radiation patternable coating, further processing can be employed prior to exposure with radiation. In some embodiments, the coating can be heated from between 30° C. and 300° C., in further embodiments from between 50° C. and 200° C., and in further embodiments from between 80° C. and 150° C. The heating can be performed, in some embodiments for about 10 seconds to about 10 minutes, in further embodiments from about 30 seconds to about 5 minutes, and in further embodiments from about 45 seconds to about 2 minutes. Additional ranges for temperatures and heating durations within the above explicit ranges are anticipated and envisioned.

Patterning of the Compositions

Radiation generally can be directed to the coated substrate through a mask or a radiation beam can be controllably scanned across the substrate. In general, the radiation can comprise electromagnetic radiation, an electron-beam (beta radiation), or other suitable radiation. In general, electromagnetic radiation can have a desired wavelength or range of wavelengths, such as visible radiation, ultraviolet radiation, or X-ray radiation. The resolution achievable for the radiation pattern is generally dependent on the radiation wavelength, and a higher resolution pattern generally can be achieved with shorter wavelength radiation. Thus, it can be desirable to use ultraviolet light, X-ray radiation, or an electron-beam to achieve particularly high-resolution patterns.

Following International Standard ISO 21348 (2007) incorporated herein by reference, ultraviolet light extends between wavelengths of greater than or equal to 100 nm and less than 400 nm. A krypton fluoride laser can be used as a source for 248 nm ultraviolet light. The ultraviolet range can be subdivided in several ways under accepted Standards, such as extreme ultraviolet (EUV) from greater than or equal 10 nm to less than 121 nm and far ultraviolet (FUV) from greater than or equal to 122 nm to less than 200 nm. A 193 nm line from an argon fluoride laser can be used as a radiation source in the FUV. EUV light at 13.5 nm has been used for lithography, and this light is generated from a Xe or Sn plasma source excited using high energy lasers or discharge pulses. Soft x-rays can be defined from greater than or equal to 0.1 nm to less than 10 nm.

Based on the design of the coating material, there can be a large contrast of material properties between the irradiated regions that have condensed coating material and the unirradiated, coating material with substantially intact Sn—C bonds. For embodiments in which a post irradiation heat treatment is used, the post-irradiation heat treatment can be performed at temperatures from about 45° C. to about 250° C., in additional embodiments from about 50° C. to about 190° C. and in further embodiments from about 60° C. to about 175° C. The post exposure heating can generally be performed for at least about 0.1 minute, in further embodiments from about 0.5 minutes to about 30 minutes and in additional embodiments from about 0.75 minutes to about 10 minutes. A person of ordinary skill in the art will recognize that additional ranges of post-irradiation heating temperature and times within the explicit ranges above are contemplated and are within the present disclosure. This high contrast in material properties further facilitates the formation of high-resolution lines with smooth edges in the pattern following development as described in the following section.

For the negative tone imaging, the developer can be an organic solvent, such as the solvents used to form the precursor solutions. In general, developer selection can be influenced by solubility parameters with respect to the coating material, both irradiated and non-irradiated, as well as developer volatility, flammability, toxicity, viscosity and potential chemical interactions with other process material. In particular, suitable developers include, for example, alcohols (e.g., 4-methyl-2-pentanol, 1-butanol, isopropanol, 1-propanol, methanol), ethyl lactate, ethers (e.g., tetrahydrofuran, dioxane, anisole), esters (propylene glycol monomethyl ether acetate, ethyl acetate, ethyl lactate), ketones (pentanone, hexanone, 2-heptanone, octanone), and the like, and mixtures thereof. Suitable developers are further described in published U.S. Patent Application No. 2020/0326627 to Jiang et. al, entitled "Organometallic photoresist developer compositions and processing methods", incorporated herein by reference, and such developers may generally include solvent blends of ketone, alcohol, ether, ester and water, glycol ether, pyrrolidone, lactone, carboxylic acid, or combinations thereof. The development can be performed for about 5 seconds to about 30 minutes, in further embodiments from about 8 seconds to about 15 minutes and in additional embodiments from about 10 seconds to about 10 minutes. A person of ordinary skill in the art will recognize that additional ranges within the explicit ranges above are contemplated and are within the present disclosure.

With a weaker developer, e.g., diluted organic developer or compositions in which the coating has a lower development rate, a higher temperature development process can be used to increase the rate of the process. With a stronger developer, the temperature of the development process can be lower to reduce the rate and/or control the kinetics of the development. In general, the temperature of the development can be adjusted between the appropriate values consistent with the volatility of the solvents. Additionally, developer with dissolved coating material near the developer-coating interface can be dispersed with ultrasonication during development. The developer can be applied to the patterned coating material using any reasonable approach. For example, the developer can be sprayed onto the patterned coating material. Also, spin coating can be used. For automated processing, a puddle method can be used involving the pouring of the developer onto the coating material in a stationary format. If desired spin rinsing and/or drying can be used to complete the development process. Suitable rinsing solutions include, for example, ultrapure water, aqueous tetraalkyl ammonium hydroxide, methyl alcohol, ethyl alcohol, propyl alcohol and combinations thereof. After the image is developed, the coating material is disposed on the substrate as a pattern.

In some embodiments, a solventless (dry) development process may be conducted through the use of an appropriate thermal development or plasma development process, such as those described by Tan et. al in PCT Pat App. No: PCT/US2020/039615 entitled "Photoresist Development With Halide Chemistries", incorporated herein by reference. For organotin photoresist coatings, dry development can be conducted through the use of halogen-containing plasmas and gases, for example HBr and $BCl_3$. In some cases, dry development may offer advantages over wet development such as reduced pattern collapse, deceased scum, and fine control over developer compositions, i.e. the plasma and/or etch gases.

After completion of the development step, the coating materials can be heat treated to further condense the material and to further dehydrate, densify, or remove residual developer from the material. This heat treatment can be particularly desirable for embodiments in which the oxide coating material is incorporated into the ultimate device, although it may be desirable to perform the heat treatment for some embodiments in which the coating material is used as a resist and ultimately removed if the stabilization of the coating material is desirable to facilitate further patterning. In particular, the bake of the patterned coating material can be performed under conditions in which the patterned coating material exhibits desired levels of etch selectivity. In some embodiments, the patterned coating material can be heated to a temperature from about 100° C. to about 600° C., in further embodiments from about 175° C. to about 500° C. and in additional embodiments from about 200° C. to about 400° C. The heating can be performed for at least about 1 minute, in other embodiment for about 2 minutes to about 1 hour, in further embodiments from about 2.5 minutes to about 25 minutes. The heating may be performed in air, vacuum, or an inert gas ambient, such as Ar or $N_2$. A person of ordinary skill in the art will recognize that additional ranges of temperatures and time for the heat treatment within the explicit ranges above are contemplated and are within the present disclosure. Likewise, non-thermal treatments, including blanket UV exposure, or exposure to an oxidizing plasma such as $O_2$ may also be employed for similar purposes.

EXAMPLES

Example 1. Synthesis of (1) potassium tris(tert-butyl oxide)tin ($KSn(OtBu)_3$) and (2) Conversion to methyltin tris(tert-butyl oxide)

This example describes a method for the one-pot, direct synthesis of an organo tin trialkoxide. The method is based on the following two reactions, with the second reaction performed at room temperature and employing a tetraalkyl (quaternary) ammonium salt as a catalyst. Experiments described in all of the examples are performed under oxygen depleted inert atmospheres, such as nitrogen, argon or other inert atmospheres.

$$SnCl_2 + K(OtBu) \rightarrow KSn(OtBu)_3 \quad (1)$$

$$KSn(OtBu)_3 + CH_3I \rightarrow MeSn(OtBu)_3 \quad (2)$$

(1) Tin dichloride and anhydrous tetrahydrofuran were added to a reaction vessel under inert atmosphere to form a solution having a concentration of approximately 0.07 g $SnCl_2$/ml THF. The solution was mixed for while cooling to 4° C. Then 2.0 molar equivalents of potassium tert-butyl oxide relative to the initial tin dichloride amount was added slowly. The reaction mixture was maintained at a temperature below 60° C. Upon completion of the addition step, the reaction mixture was stirred for 1 hour. The resulting white precipitate was removed by filtration over a bed of celite and the filtrate was collected. Additional potassium tert-butyl oxide (0.9 molar equivalents relative to the initial tin dichloride amount) was added slowly to the filtrate. In view of processing practicalities, the 0.9 molar equivalents relative to initial tin is roughly a molar equivalent relative to persistent tin. The reaction mixture was maintained at a temperature below 60° C. Volatiles were removed under vacuum and the product was recrystallized from a 1:1 mixture of THF/Toluene (~2 mL/g product) at −20° C. to afford $KSn(OtBu)_3$ as a white crystalline solid.

Figure 2:
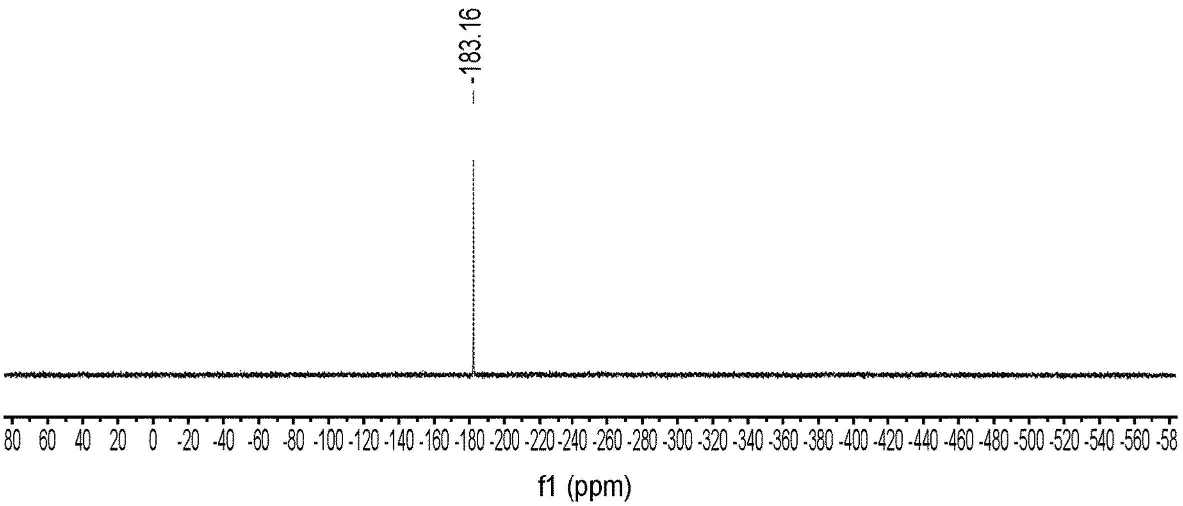
FIG. 2 is a $^{119}Sn$ NMR spectrum of $KSn(OtBu)_3$ in THF.

FIG. 1 shows the $^1H$ NMR spectrum of $KSn(OtBu)_3$. There is a singular chemical shift: $^1H$ NMR (400 MHz, THF) δ 1.17 ppm (s). FIG. 2 shows the $^{119}Sn$ NMR spectrum of $KSn(OtBu)_3$. There is a singular chemical shift: $^{119}Sn$ NMR (149 MHz, THF) δ −183 ppm.

Figure 3:
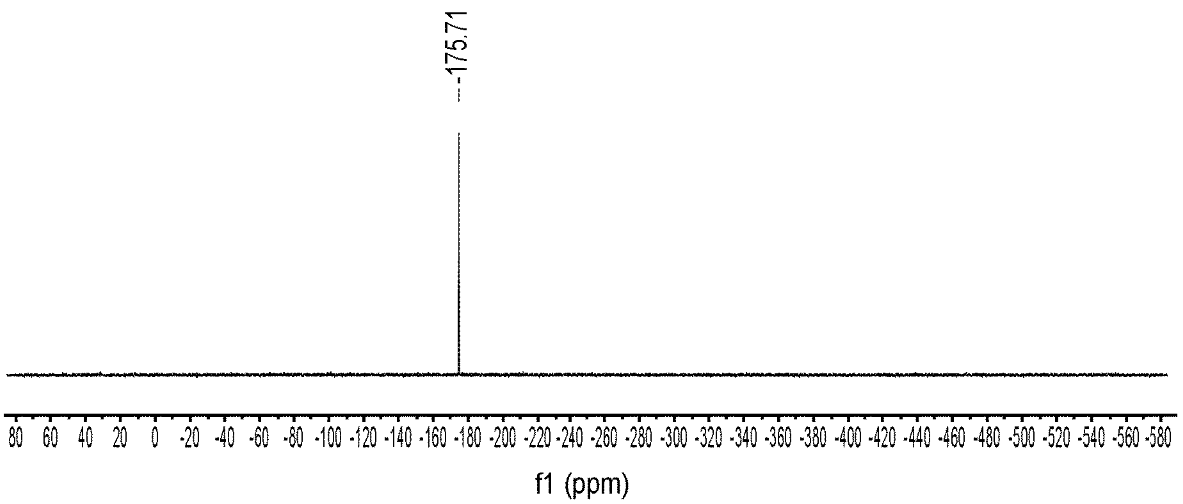
FIG. 3 is a $^{119}Sn$ NMR spectrum of $MeSn(OtBu)_3$.

(2) The $KSn(OtBu)_3$ product from (1) (one molar equivalent) was mixed with, 0.5 molar equivalents of tetrabutylammonium iodide ($(n\text{-}Bu)_4N(I)$) as a catalyst, and toluene were added to the reaction vessel under inert atmosphere to form a solution having a concentration of approximately 0.10 g $KSn(OtBu)_3$/ml toluene. The solution was mixed for at room temperature. Then 1.5 molar equivalents of methyl iodide ($CH_3I$) relative to the $KSn(OtBu)_3$ amount was added slowly and the reaction was stirred for 1 hour at room temperature. Volatiles were removed under vacuum and the remaining residue was filtered over a bed of celite with pentane. The filtrate was pumped down and distilled to afford $MeSn(OtBu)_3$ as a clear yellow liquid. FIG. 3 shows the $^{119}Sn$ NMR spectrum of the product $MeSn(OtBu)_3$. which displays a single peak: $^{119}Sn$ NMR (149 MHz, neat) δ−175). The singular tin environment indicates that there are no identified tin by-products in the conversion of $KSn(OtBu)_3$ to $MeSn(OtBu)_3$.

This example demonstrates a two-step, one-pot method for directly synthesizing an organotin trialkoxide having primary Sn—C bonds with high mono-organo specificity. The method uses commercially available tin dichloride, alkali alkoxide, and alkyl halide reagents.

Example 2. Synthesis of 2-propyltin tris(tert-butyl oxide)

This example describes a method for the one-pot, direct synthesis of an organo tin trialkoxide. The method is based on the following reaction. The reaction is performed with the addition of heat and a tetraalkyl (quaternary) ammonium salt as a catalyst.

$$KSn(OtBu)_3+(CH_3)_2CH_2I \rightarrow {}^iPrSn(OtBu)_3$$

Figure 4:
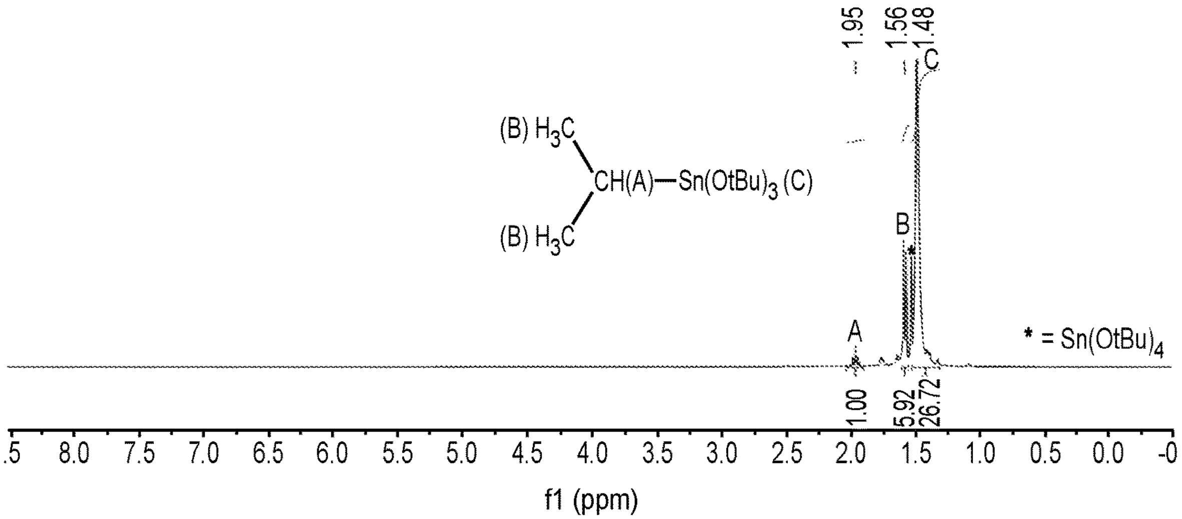
FIG. 4 is a $^1H$ NMR spectrum of $^{i}PrSn(OtBu)_3$.
Figure 5:
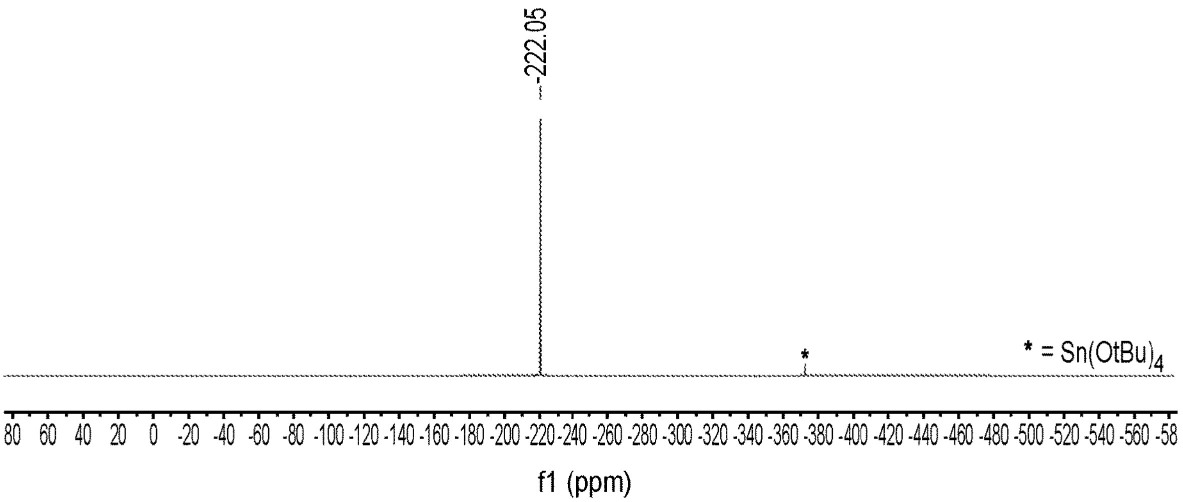
FIG. 5 is a $^{119}Sn$ NMR spectrum of $^{i}PrSn(OtBu)_3$.

The $KSn(OtBu)_3$ product from Example 1, 0.67 molar equivalents (referenced to 1 molar equivalent of tin) of tetrabutylammonium iodide ($(n\text{-}Bu)_4N(I)$) as a catalyst, and toluene were added to a reaction vessel under inert atmosphere and mixed to form a solution having a concentration of approximately 0.10 g $KSn(OtBu)_3$/ml toluene. The solution was mixed for at room temperature. Then 1.5 molar equivalents of 2-iodopropane ($(CH_3)_2CH_2I$) relative to the $KSn(OtBu)_3$ amount was added slowly with stirring. Then the reaction mixture was heated to 80° C. and stirred for 2 days. Afterwards, volatiles were removed under vacuum and the remaining residue was filtered over a bed of celite with pentane. The filtrate was pumped down and distilled to afford 2-propyltin tris(tert-butyl oxide) ($^iPrSn(OtBu)_3$) as a clear yellow liquid. FIG. 4 is the $^1H$ NMR spectrum of the product $^iPrSn(OtBu)_3$, which shows the following chemical shifts: $^1H$ NMR (400 MHz, neat) δ 1.95 (hept, $^1H$), 1.56 (d, 6H), 1.48 (s, 27H) ppm. FIG. 5 shows the $^{119}Sn$ NMR spectrum of the product $^iPrSn(OtBu)_3$, which displays a single peak: $^{119}Sn$ NMR (149 MHz, neat) δ −222 ppm). The singular tin environment indicates that there are no identified tin by-products in the conversion of $KSn(OtBu)_3$ to $^iPrSn(OtBu)_3$.

This example demonstrates a method for directly synthesizing an organotin trialkoxide having secondary Sn—C bonds with high mono-organo specificity.

Example 3. Synthesis of 1-propyltin tris(tert-butyl oxide)

This example describes two methods that use different alkylhalides (RX) for the one-pot, direct synthesis of an organo tin trialkoxide. The methods are based on the following reaction, with RX being $^nPrI$ in Method A and $^nPrBr$ in Method B. The reactions were performed with the addition of heat and a tetraalkyl (quaternary) ammonium salt as a catalyst.

$$KSn(OtBu)_3+RX \rightarrow {}^nPrSn(OtBu)_3$$

Figure 6:
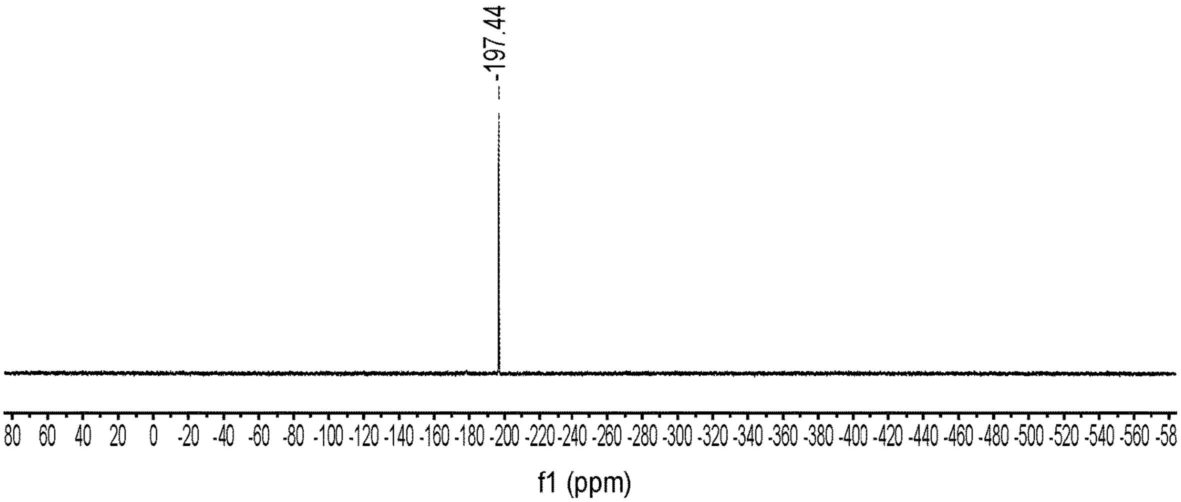
FIG. 6 is a $^{119}Sn$ NMR spectrum of $^{n}PrSn(OtBu)_3$.

Method A. The $KSn(OtBu)_3$ product from Example 1, 0.5 molar equivalents (referenced to 1 molar equivalent of tin) of tetrabutylammonium iodide ($(n\text{-}Bu)_4N(I)$) as a catalyst, and toluene were added to a reaction vessel under inert atmosphere and mixed to form a solution having a concentration of approximately 0.10 g $KSn(OtBu)_3$/ml toluene. The solution was mixed for at room temperature. Then 1.3 molar equivalents of 1-iodopropane ($^nPrI$) relative to the $KSn(OtBu)_3$ amount was added slowly with stirring. Then the reaction mixture was heated to 45° C. and stirred for 1 day. Afterwards, volatiles were removed under vacuum and the remaining residue was filtered over a bed of celite with pentane. The filtrate was pumped down and distilled to afford 1-propyltin tris(tert-butyl oxide) ($^nPrSn(OtBu)_3$) as a clear yellow liquid. FIG. 6 shows the $^{119}Sn$ NMR spectrum of the product $^nPrSn(OtBu)_3$, which displays a single peak: $^{119}Sn$ NMR (149 MHz, neat) δ −197 ppm). The singular tin environment indicates that there are no identified tin by-products in the conversion of $KSn(OtBu)_3$ to $^nPrSn(OtBu)_3$.

Figure 7:
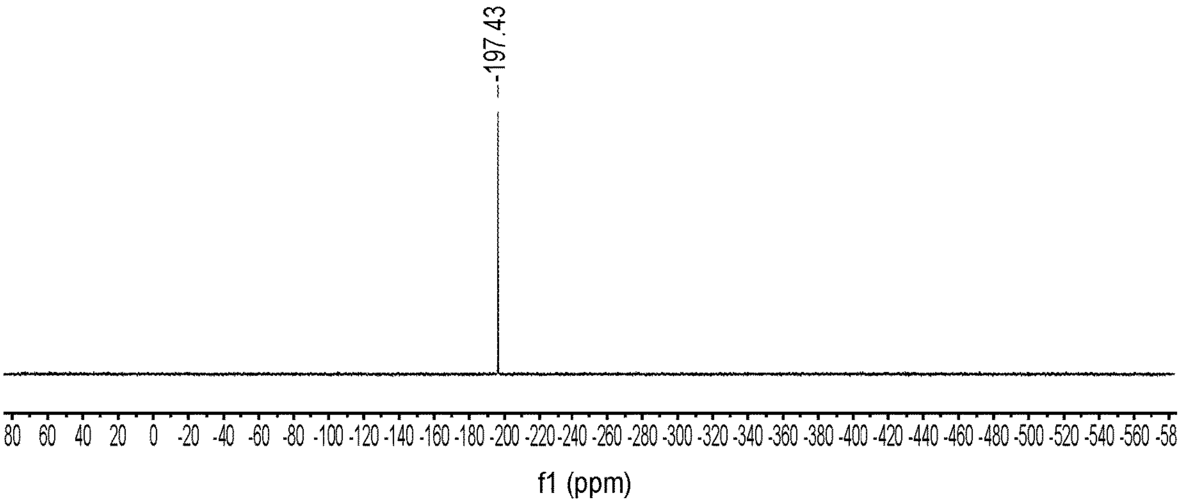
FIG. 7 is a $^{119}Sn$ NMR spectrum of $^{n}PrSn(OtBu)_3$.

Method B. The procedure of Method A was repeated with two exceptions: 0.4 molar equivalents of tetrabutylammonium iodide were used as a catalyst and 1.3 molar equivalents of 1-bromopropane ($^nPrBr$) relative to the $KSn(OtBu)_3$ amount was used as the alkylhalide reagent. The filtrate was distilled to afford 1-propyltin tris(tert-butyl oxide) ($^nPrSn(OtBu)_3$) as a clear yellow liquid. FIG. 7 shows the $^{119}Sn$ NMR spectrum of the product $^nPrSn(OtBu)_3$, which displays a single peak: $^{119}Sn$ NMR (149 MHz, neat) δ−197 ppm). The singular tin environment indicates that there are no identified tin by-products in the conversion of $KSn(OtBu)_3$ to $^nPrSn(OtBu)_3$.

This example demonstrates that different halide groups can be used in the direct synthesis of organotin trialkoxides having high mono-organo specificity.

Example 4. Synthesis of 1-but-3-enyltin tris(tert-butyl oxide) (MAL)

This example describes a method for the one-pot, direct synthesis of an unsaturated organo tin trialkoxide. The method is based on the following reaction. The reaction is performed with the addition of heat and a tetraalkyl (quaternary) ammonium salt as a catalyst.

$$KSn(OtBu)_3+(CH_3)(H)C{=}C(H)(CH_2Cl), \rightarrow (CH_3)(H)C{=}C(H)(CH_2)Sn(OtBu)_3$$

The $KSn(OtBu)_3$ product from Example 1, 0.1 molar equivalents (referenced to 1 molar equivalent of tin) of tetrabutylammonium iodide ($(n\text{-}Bu)_4N(I)$) as a catalyst, and toluene were added to a reaction vessel under inert atmosphere and mixed to form a solution having a concentration of approximately 0.10 g $KSn(OtBu)_3$/ml toluene. The solution was mixed for at room temperature. Then 1.2 molar equivalents of 1-chloro-2-butene ($(CH_3)(H)C{=}C(H)(CH_2Cl)$ (mixture of trans- and cis- and isomers, in an approximate ratio of 70:30) relative to the $KSn(OtBu)_3$ amount was added slowly with stirring. Then the reaction mixture was heated to 45° C. and stirred for 3 days. Afterwards, volatiles were removed under vacuum and the remaining residue was filtered over a bed of celite with pentane. The filtrate was pumped down and distilled to afford the product $(CH_3)(H)C{=}C(H)(CH_2)Sn(OtBu)_3$ (1-but-3-enyltin tris(tert-butyl oxide) or MAL) as a mixture of trans- and cis-isomers. The product was a clear yellow liquid.

Figure 8:
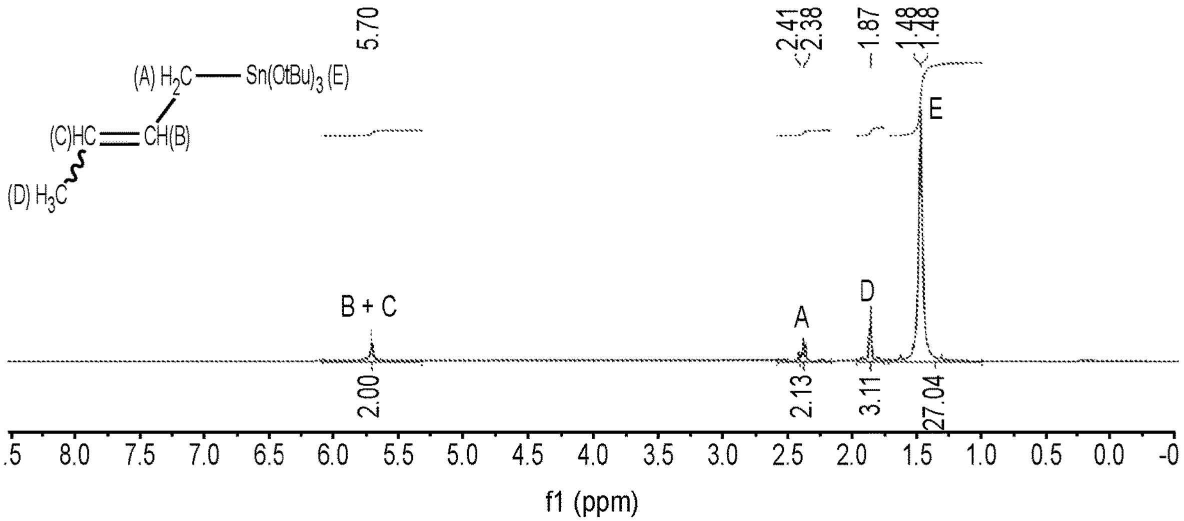
FIG. 8 is a $^1H$ NMR spectrum of 1-but-3-enyltin tris(tert-butyl oxide) (MAL).
Figure 9:
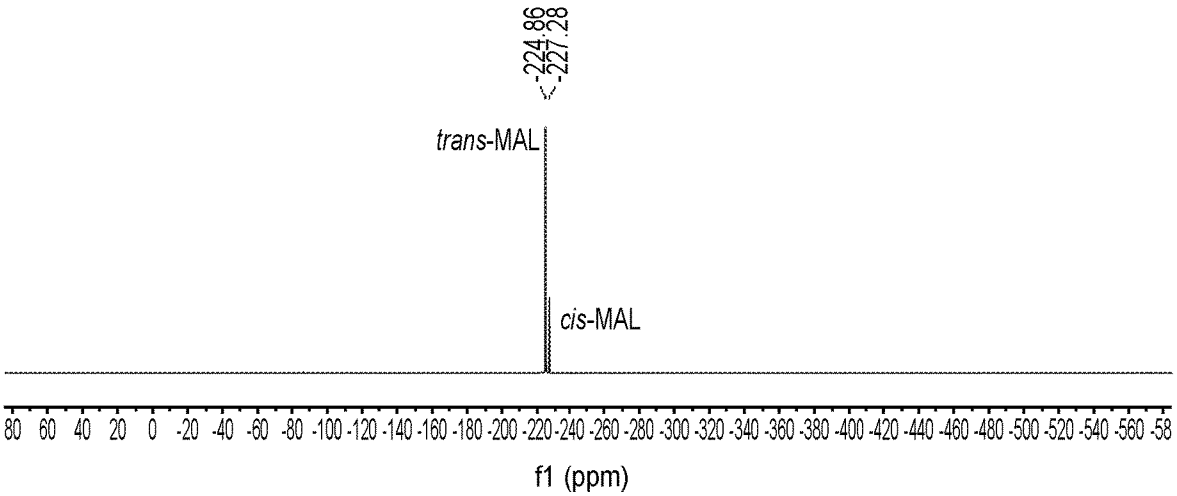
FIG. 9 is a $^{119}Sn$ NMR spectrum of 1-but-3-enyltin tris(tert-butyl oxide) (MAL).

FIG. 8 is the $^1H$ NMR spectrum of the product $(CH_3)(H)C{=}C(H)(CH_2)Sn(OtBu)_3$, which shows the following chemical shifts: $^1H$ NMR (400 MHz, neat) δ 5.70 (m, 2H), 2.41 (cis)+2.38 (trans) (m, 2H), 1.87 (m, 3H), 1.48 (cis)+1.49 (trans) (s, 27H) ppm. FIG. 9 is the $^{119}Sn$ NMR spectrum of $(CH_3)(H)C{=}C(H)(CH_2)Sn(OtBu)_3$, which shows the following chemical shifts: $^{119}Sn$ NMR (149 MHz, neat) δ −225 (trans), −227 (cis) ppm. The results indicate that the major isomeric species is trans-, with the ratio of the isomers in the MAL product retaining the ratio of the isomers in the 1-chloro-2-butene reagent. The results also indicate that there are no identified tin by-products in the conversion of $KSn(OtBu)_3$ to $(CH_3)(H)C{=}C(H)(CH_2)Sn(OtBu)_3$.

This example demonstrates a method for directly synthesizing an unsaturated organotin trialkoxide with high mono-organo specificity. This example also demonstrates that the method proceeds with both the trans- and cis-isomers of an olefinic halide reagent.

Example 5. UV-based Synthesis of 2,2,2-trifluoroethyltin tris(tert-butyl oxide) (TFE)

This example describes a method for the one-pot, direct synthesis of a fluorinated organo tin trialkoxide under UV light. The method is based on the following reaction.

$$Sn_2(OtBu)_4+CF_3CH_2I \rightarrow CF_3CH_2Sn(OtBu)_3$$

$Sn_2(OtBu)_4$, 1.3 molar equivalents (referenced to 1 molar equivalent of ditin reactant) of 2,2,2-trifluoroiodoethane ($CF_3CH_2I$), and pentane were added to a reaction vessel under inert atmosphere and mixed to form a solution having a concentration of approximately 0.33 g $Sn_2(OtBu)_4$/ml pentane. The solution was mixed for at room temperature. Then the solution was irradiated with ultraviolet light (40 W LED; 365 nm) overnight (approximately 15 hours). Afterwards, the reaction mixture was filtered over a bed of celite and the volatiles of the filtrate were removed under vacuum. The resulting filtrate was distilled to afford the final product $CF_3CH_2Sn(OtBu)_3$ (2,2,2-trifluoroethyltin tris(tert-butyl oxide) or TFE). The product was a clear yellow liquid.

Figure 10:
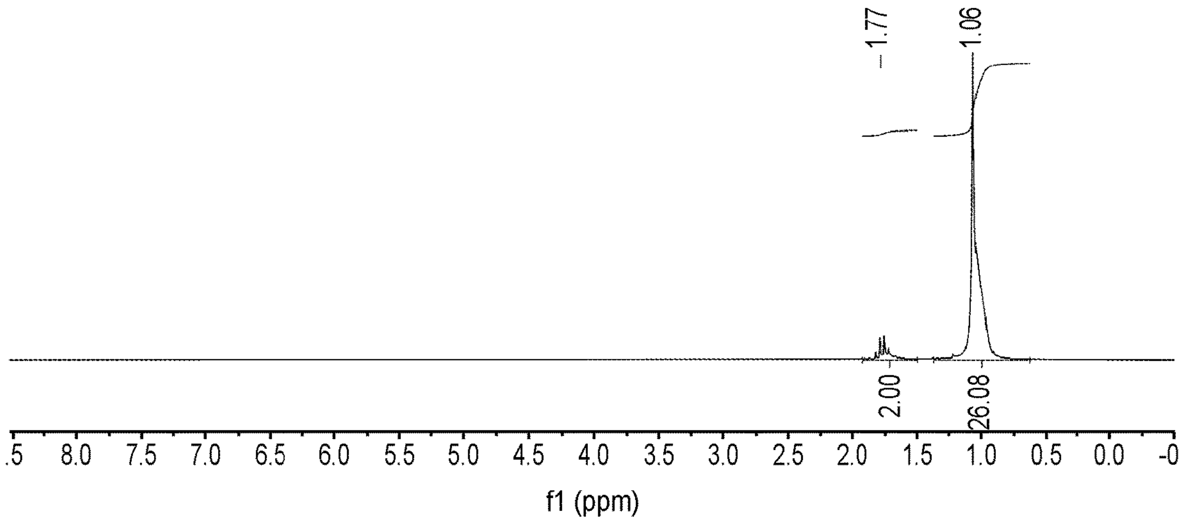
FIG. 10 is a $^1H$ NMR spectrum of 2,2,2-trifluoroethyltin tris(tert-butyl oxide) (TFE).
Figure 11:
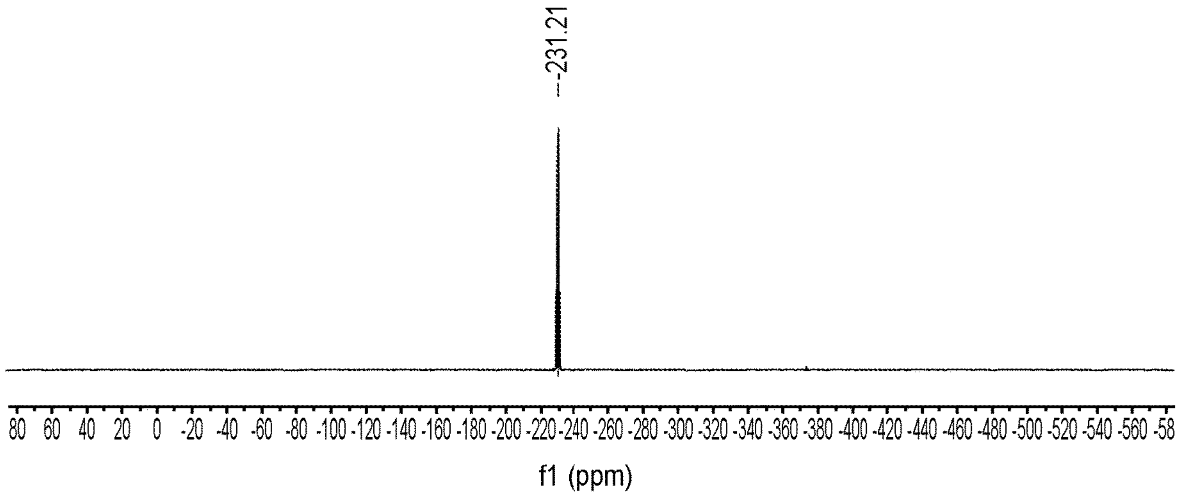
FIG. 11 is a $^{119}Sn$ NMR spectrum of 2,2,2-trifluoroethyltin tris(tert-butyl oxide) (TFE).
Figure 12:
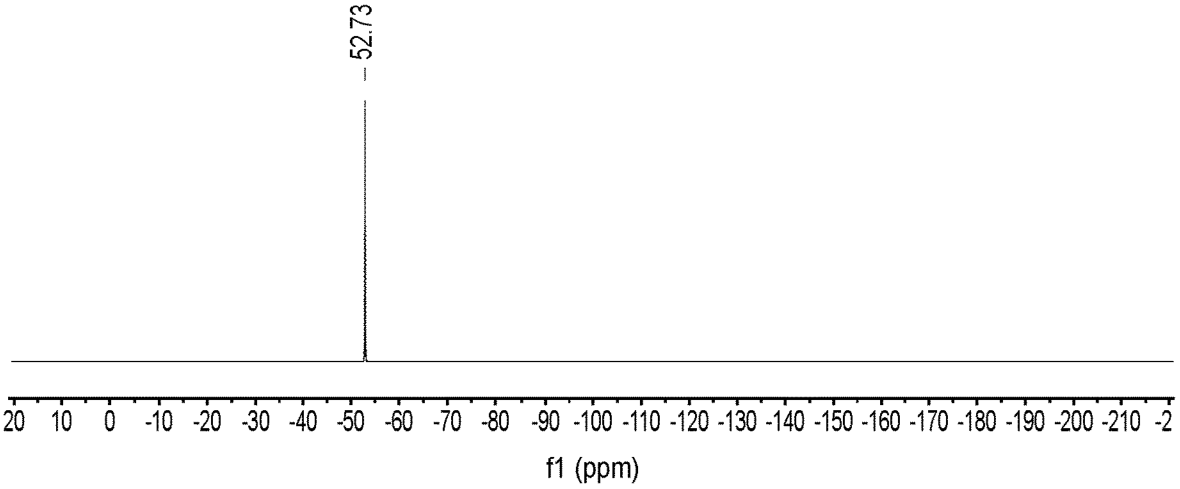
FIG. 12 is a $^{19}F$ NMR spectrum of 2,2,2-trifluoroethyltin tris(tert-butyl oxide) (TFE).

FIG. 10 is the $^1H$ NMR spectrum of the product $CF_3CH_2Sn(OtBu)_3$, which shows the following chemical shifts: $^1H$ NMR (400 MHz, neat) δ 1.77 (m, 2H), 1.06 (s, 27H) ppm. FIG. 11 is the $^{119}Sn$ NMR spectrum of the product $CF_3CH_2Sn(OtBu)_3$, which shows a single peak: $^{119}Sn$ NMR (149 MHz, neat) δ −231 (q) ppm. FIG. 12 is the $^{19}F$ NMR spectrum of the product $CF_3CH_2Sn(OtBu)_3$, which shows the following chemical shift: $^{19}F$ NMR (neat) δ −53 (m) ppm.

The NMR results indicate that there are no identified tin by-products in the conversion of $KSn(OtBu)_3$ to $CF_3CH_2Sn(OtBu)_3$.

This example demonstrates a photochemical method for directly synthesizing a fluorinated organotin trialkoxide with high mono-organo specificity.

Example 6. LED-Based Synthesis of 2,2,2-trifluoroethyltin tris(tert-butyl oxide) (TFE)

This example describes a photochemical method for the one-pot, direct synthesis of a fluorinated organo tin trialkoxide under visible (LED) light. The method is based on the following reaction.

$$KSn(OtBu)_3+CF_3CH_2I \rightarrow CF_3CH_2Sn(OtBu)_3$$

Part 1: Purple and Blue Light Studies

The $KSn(OtBu)_3$ product from Example 1, 1.1 molar equivalents (referenced to 1 molar equivalent of tin) of 2,2,2-trifluoroiodoethane ($CF_3CH_2I$), and acetonitrile were added to a reaction vessel under inert atmosphere and mixed to form a solution having a concentration of approximately 0.25 g $KSn(OtBu)_3$/ml acetonitrile. The solution was mixed for at room temperature. Then, while stirring, the solution was irradiated with visible light for 1 day. The visible light was provided via a 100 W LED and was either purple light (approximately 400 nm) or blue light (approximately 460 nm). The external temperature of the reaction vessel was maintained below 30° C. with the use of a fan. Afterwards, the reaction solvent was removed under reduced pressure and the remaining residue was filtered over a bed of celite with pentane. Volatiles of the filtrate were removed under vacuum and the resulting oil was distilled to afford the final product $CF_3CH_2Sn(OtBu)_3$ (2,2,2-trifluoroethyltin tris(tert-butyl oxide) or TFE). The product was a clear yellow liquid.

Figure 13:
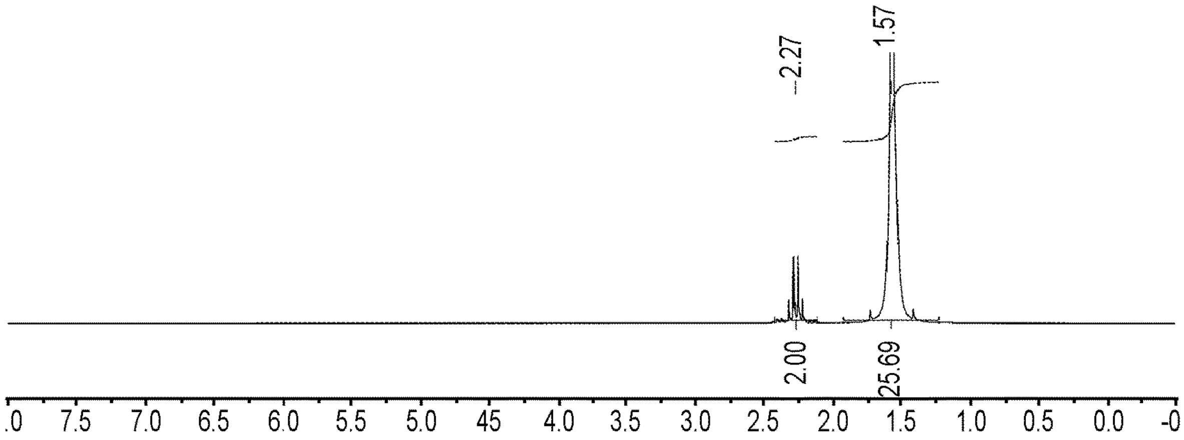
FIG. 13 is the $^1H$ NMR spectrum of $CF_3CH_2Sn(OtBu)_3$.
Figure 14:
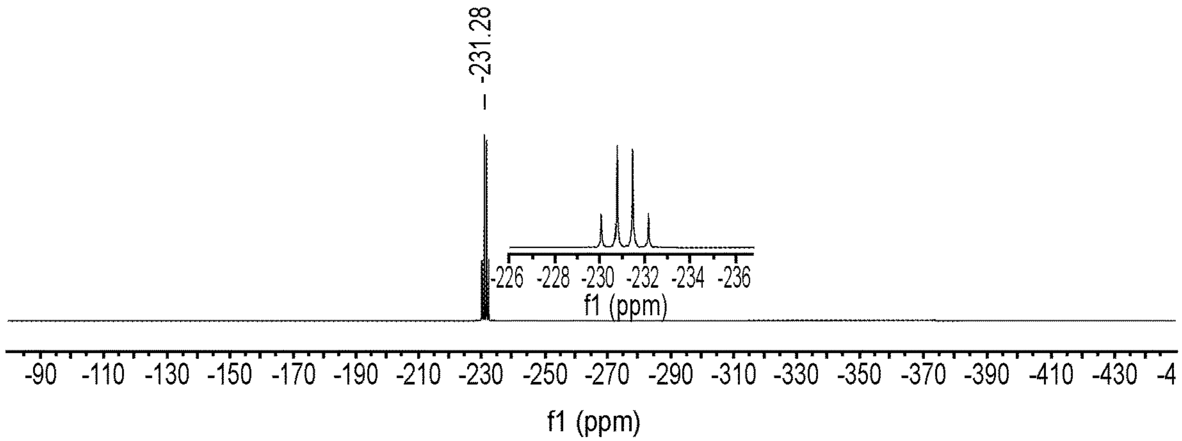
FIG. 14 is the $^{119}Sn$ NMR spectrum of $CF_3CH_2Sn(OtBu)_3$.

FIGS. 13 and 14 show NMR spectra of the product prepared with the purple light. The product prepared with the blue light showed indistinguishable results. FIG. 13 is the $^1H$ NMR spectrum of the product $CF_3CH_2Sn(OtBu)_3$, which shows the following chemical shifts: $^1H$ NMR (400 MHz, neat) δ 1.57 (s, 27H), 2.27 (q, 2H) ppm. FIG. 14 is the $^{119}Sn$ NMR spectrum of the product $CF_3CH_2Sn(OtBu)_3$, which shows the following chemical shift: $^{119}Sn$ NMR (149 MHz, neat) δ −231 (q) ppm. The results indicate that there are no identified tin by-products in the conversion of $KSn(OtBu)_3$ to $CF_3CH_2Sn(OtBu)_3$.

Part 2. Green Light Study

Figure 15:
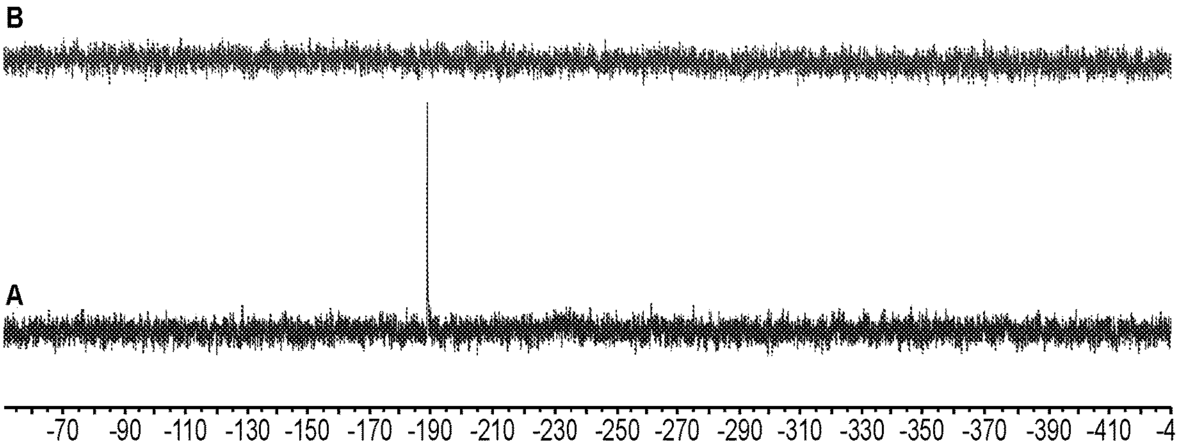
FIG. 15 shows the $^{119}Sn$ NMR spectra of a solution of $KSn(OtBu)_3$ and $CF_3CH_2I$ after 1 hour of irradiation with green LED light (A) and after 3 hours of irradiation with green LED light (B).
Figure 16:
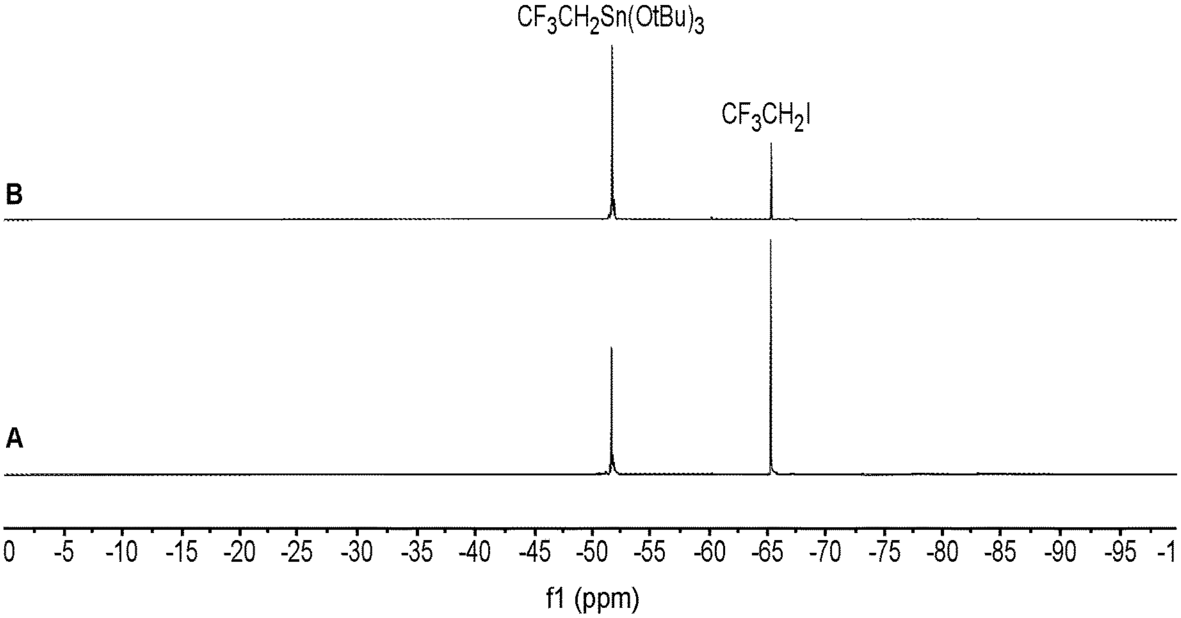
FIG. 16 shows the $^{19}F$ NMR spectra of a solution of $KSn(OtBu)_3$ and $CF_3CH_2I$ after 1 hour of irradiation with green LED light (A) and after 3 hours of irradiation with green LED light (B).

A solution was prepared according to Part 1 with the exception that the solution was provided in a sealed NMR tube (under inert atmosphere) instead in a reaction vessel. The NMR tube was irradiated for 3 hours with a 100 W green LED (approximately 530 nm). Conversion to the product $CF_3CH_2Sn(OtBu)_3$ was confirmed by the disappearance of the $KSn(O^tBu)_3$ signal in $^{119}Sn$ NMR (δ −188 ppm), as shown in FIG. 15. (Note that the $^{119}Sn$ peak for the product $CF_3CH_2Sn(OtBu)_3$ in the reaction mixture is too broad to be observed). Conversion to the product $CF_3CH_2Sn(OtBu)_3$ was further confirmed by the presence of the $CF_3CH_2Sn(OtBu)_3$ signal in $^{19}F$ NMR. As shown in FIG. 16, after one hour both the reagent $CF_3CH_2I$ and the product $CF_3CH_2Sn(OtBu)_3$ signals can be seen, with the reagent signal being more intense. After three hours the relative magnitude of the reagent and product signals is inverted, which is consistent with the progression of the reaction to completion.

Part 3. Ambient Light Studies

An additional experiment was performed to study the effect of the LED light on the method. A solution of $KSn(OtBu)_3$. 1.5 molar equivalents (referenced to 1 molar equivalent of tin) of $CF_3CH_2I$, and acetonitrile were added to a reaction vessel under inert atmosphere and mixed to form a solution having a concentration of approximately 0.33 g $KSn(OtBu)_3$/ml acetonitrile (Solution A). Another solution in the same way as Solution A except 0.4 molar equivalents of tetrabutylammonium iodide relative to the $KSn(OtBu)_3$ amount was also added (Solution B). Solution A and Solution B were each heated to 80° C. and stirred for 2 days. Afterwards, NMR analyses were performed for each of the samples. The results showed that $CF_3CH_2Sn(OtBu)_3$ was not formed for either sample, indicating that more photons than standard ambient light provides is needed to form the fluorinated trialkoxy product. The results of this study are in contrast to the results shown in Example 2 in which a non-fluorinated trialkoxy product was prepared with the same reagents and the same heating conditions as used with Solution B.

This example demonstrates a photochemical method for directly synthesizing a fluorinated organotin trialkoxide with high mono-organo specificity and high yield. This example also demonstrates that the method is effective with visible light of various wavelengths. This example further demonstrates that the reaction to form the fluorinated trialkoxy product is photochemically driven.

Example 7. Synthesis of butyl di-tin hexa(tert-butyl oxide) (BDT)

This example describes a method for the direct synthesis of the organo di-tin trialkoxide represented by Formula 1. The method is based on the following reaction. The reaction is performed with the addition of heat and a tetraalkyl (quaternary) ammonium salt as a catalyst and the product is purified via sublimation.

$$KSn(OtBu)_3 + (CH_2I)CH_2)_2CH_2I \longrightarrow C_4H_8Sn_2(OtBu)_6$$

(Formula 1)

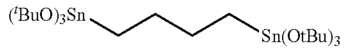

Figure 17:
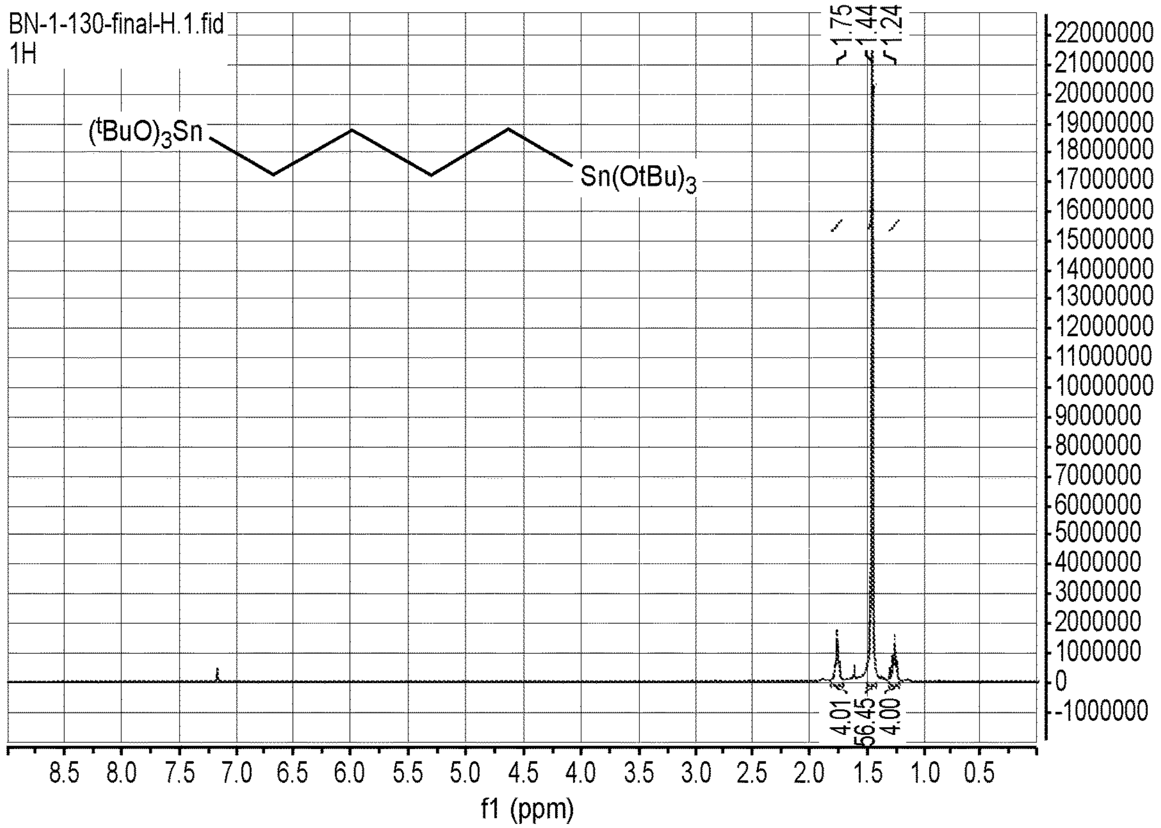
FIG. 17 is the $^1H$ NMR spectrum of $C_4H_8Sn_2(OtBu)_6$ in $C_6D_6$.
Figure 18:
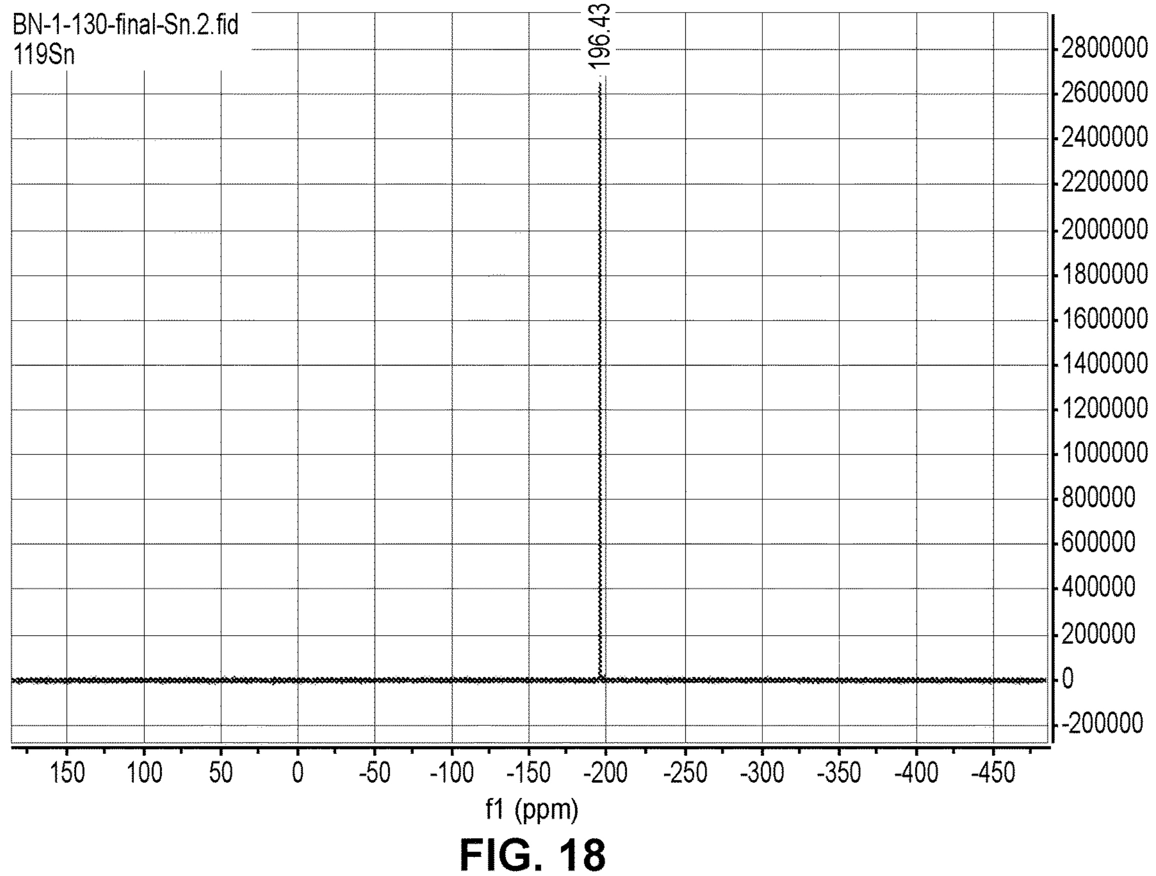
FIG. 18 is the $^{119}Sn$ NMR spectrum of $C_4H_8Sn_2(OtBu)_6$ in $C_6D_6$.

The $KSn(OtBu)_3$ product from Example 1 (2.1 molar equivalents), tetrabutylammonium iodide ($(n\text{-}Bu)_4N(I)$) (0.21 molar equivalents) as a catalyst, and toluene) were added to a reaction vessel under inert atmosphere and mixed to form a solution having a concentration of approximately 0.5 mmol $KSn(OtBu)_3$/ml toluene. The solution was mixed for at room temperature. Then 1.0 molar equivalent of 1,4-diiodobutane ($(CH_2I)CH_2)_2CH_2I$, Ambeed) was added slowly with stirring. The reaction mixture was heated to 60° C. and stirred overnight (approximately 15 hours). Afterwards, volatiles were removed under vacuum and the remaining residue was dissolved into pentane. The pentane mixture was then filtered over a bed of celite. The filtrate was pumped down under reduced pressure to afford a colorless solid. The colorless solid was then stirred in acetonitrile (5 mL/g solid) overnight under inert atmosphere. Following stirring, the solids were recollected via filtration with a medium porosity fritted glass filter and washed with minimal acetonitrile. The collected solids were then dissolved into acetonitrile (10 mL/g solids) by heating at 50° C., followed by filtering the heated solution over Celite into a sealed flask, and then cooling the sealed flask at −20° C. to form crystals over the course of about 12 hours. After removing the mother liquor via decanting and evaporation, the crystalline solids were subjected to sublimation under vacuum (60 mTorr) to yield colorless crystals of the product ($C_4H_8Sn_2(OtBu)_6$, Formula 1). FIG. 17 is the $^1H$ NMR spectrum of the product $C_4H_8Sn_2(OtBu)_6$, which shows the following chemical shifts: $^1H$ NMR (400 MHz, $C_6D_6$) δ 1.75 (t, 4H), 1.25 (t, 4H), 1.45 (s, 54H, OtBu) ppm. FIG. 18 is the $^{119}Sn$ NMR spectrum of the product $C_4H_8Sn_2(OtBu)_6$, which shows a single peak: $^{119}Sn$ NMR (149 MHz, $C_6D_6$) δ −196 ppm. The NMR results indicate that there are no identified tin by-products in the conversion of $KSn(OtBu)_3$ to ($C_4H_8Sn_2(OtBu)_6$.

This example demonstrates a method for directly synthesizing an organo di-tin trialkoxide having the general formula $L_3Sn—R—SnL_3$. This example also demonstrates that sublimation can be used effectively to purify the di-tin compositions.

Example 8. Synthesis of 1,3,5-tris-(methyltin tris(tert-butyl oxide)benzene (MTT)

This example describes a method for the direct synthesis of the organo tri-tin trialkoxide, represented by Formula 2. The method is based on the following reaction. The reaction is performed with the addition of heat and a tetraalkyl (quaternary) ammonium salt as a catalyst.

$$KSn(OtBu)_3 + C_9H_9Br_3 \rightarrow C_6H_3(CH_2Sn(OtBu)_3)_3 \quad \text{(Formula 2)}$$

The $KSn(OtBu)_3$ product from Example 1, 0.1 molar equivalents (referenced to 1 molar equivalent of tin) of tetrabutylammonium iodide ($(n\text{-}Bu)_4N(I)$) as a catalyst, and toluene were added to a reaction vessel under inert atmosphere and mixed to form a solution having a concentration of approximately 0.10 g $KSn(OtBu)_3$/ml toluene. The solution was mixed for at room temperature. Then 0.3 molar equivalents of 1,3,5-tris-(bromomethyl)benzene ($C_9H_9Br_3$) relative to the $KSn(OtBu)_3$ amount was added slowly with stirring. Then the reaction mixture was heated to 45° C. and stirred overnight (approximately 15 hours). Afterwards, volatiles were removed under vacuum and the remaining residue was filtered over a bed of celite with pentane. The filtrate was pumped down and washed with MeCN to obtain a white solid.

Figure 19:
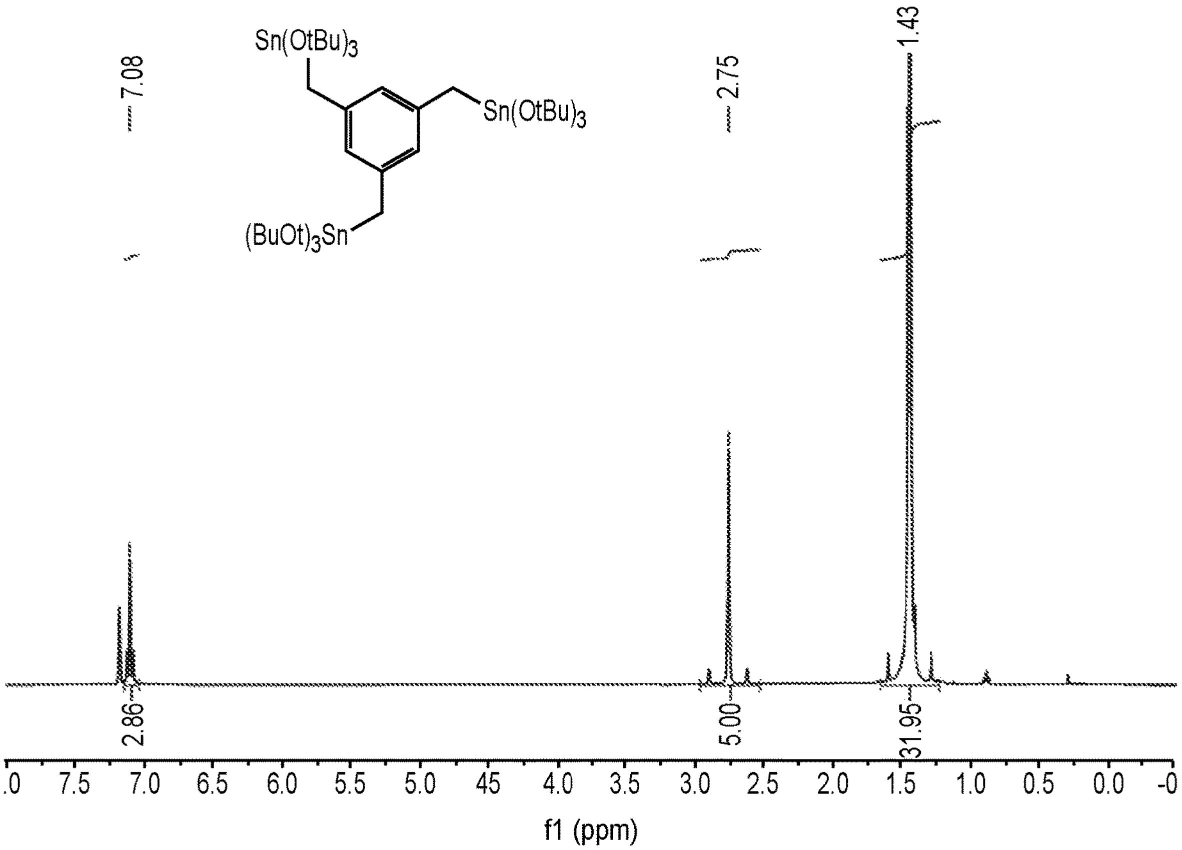
FIG. 19 is the $^1H$ NMR spectrum of $(C_6H_3(CH_2Sn(OtBu)_3)_3$ in $C_6D_6$.
Figure 20:
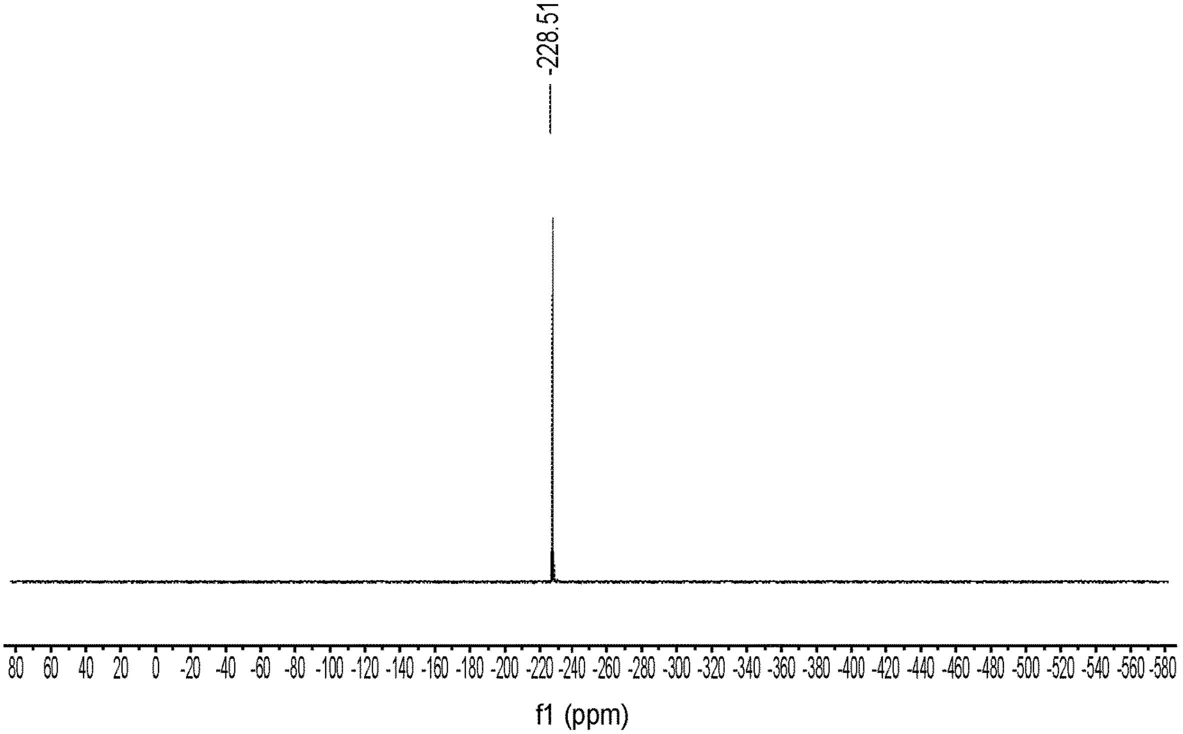
FIG. 20 is the $^{119}Sn$ NMR spectrum of $(C_6H_3(CH_2Sn(OtBu)_3)_3$ in $C_6D_6$.

FIG. 19 is the $^1H$ NMR spectrum of the product ($C_6H_3(CH_2Sn(OtBu)_3)_3$, which shows the following chemical shifts: $^1H$ NMR (400 MHz, $C_6D_6$) δ 1.45 (s, 81H), 2.75 (s, 6H), 7.08 (s, 3H) ppm. FIG. 20 is the $^{119}Sn$ NMR spectrum of the product ($C_6H_3(CH_2Sn(OtBu)_3)_3$, which shows a single peak: $^{119}Sn$ NMR (149 MHz, $C_6D_6$) δ −229 ppm. The results indicate that there are no identified tin by-products in the conversion of $KSn(OtBu)_3$ to ($C_6H_3(CH_2Sn(OtBu)_3)_3$.

This example demonstrates a method for directly synthesizing an organo tri-tin trialkoxide and suggests that other organo polytin trialkoxides could be similarly prepared.

Example 9. UV-Based Synthesis of 3,3,3,4,4,4-hexafluoroisobutyltin tris(tert-butyl oxide) (HFB)

This example describes a method for the one-pot, direct synthesis of a fluorinated organo tin trialkoxide under UV light. The method is based on the following reaction.

$$Sn_2(OtBu)_4 + (CF_3)_2CHCH_2I \longrightarrow (CF_3)_2CHCH_2Sn(OtBu)_3$$

(Formula 3)

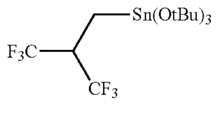

$Sn_2(OtBu)_4$ was mixed with pentane in a reaction vessel under inert atmosphere to form a solution having a concentration of approximately 0.33 g $Sn_2(OtBu)_4$/ml pentane. The mixture was cooled to −40° C. Then 1.3 molar equivalents (referenced to 1 molar equivalent of ditin reactant) of $(CF_3)_2CHCH_2I$ was added to a reaction vessel with stirring. The solution was irradiated with ultraviolet light (40 W LED; 365 nm) for approximately 12 hours with mixing while maintain a reaction temperature below −30° C. The reaction mixture was then further diluted in pentane (5 mL pentane/1 mL mixture) to form a diluted crude mixture that was then held at −20° C. for 24 hours. The reaction mixture was then filtered over a bed of celite and the volatiles of the filtrate were removed under vacuum. The resulting filtrate was distilled to afford the final product $(CF_3)_2CHCH_2Sn(OtBu)_3$ (3,3,3,4,4,4-hexafluoroisobuyltin tris(tert-butyl oxide) or HFB), as represented by Formula 3. The product was a clear yellow liquid.

Figure 21:
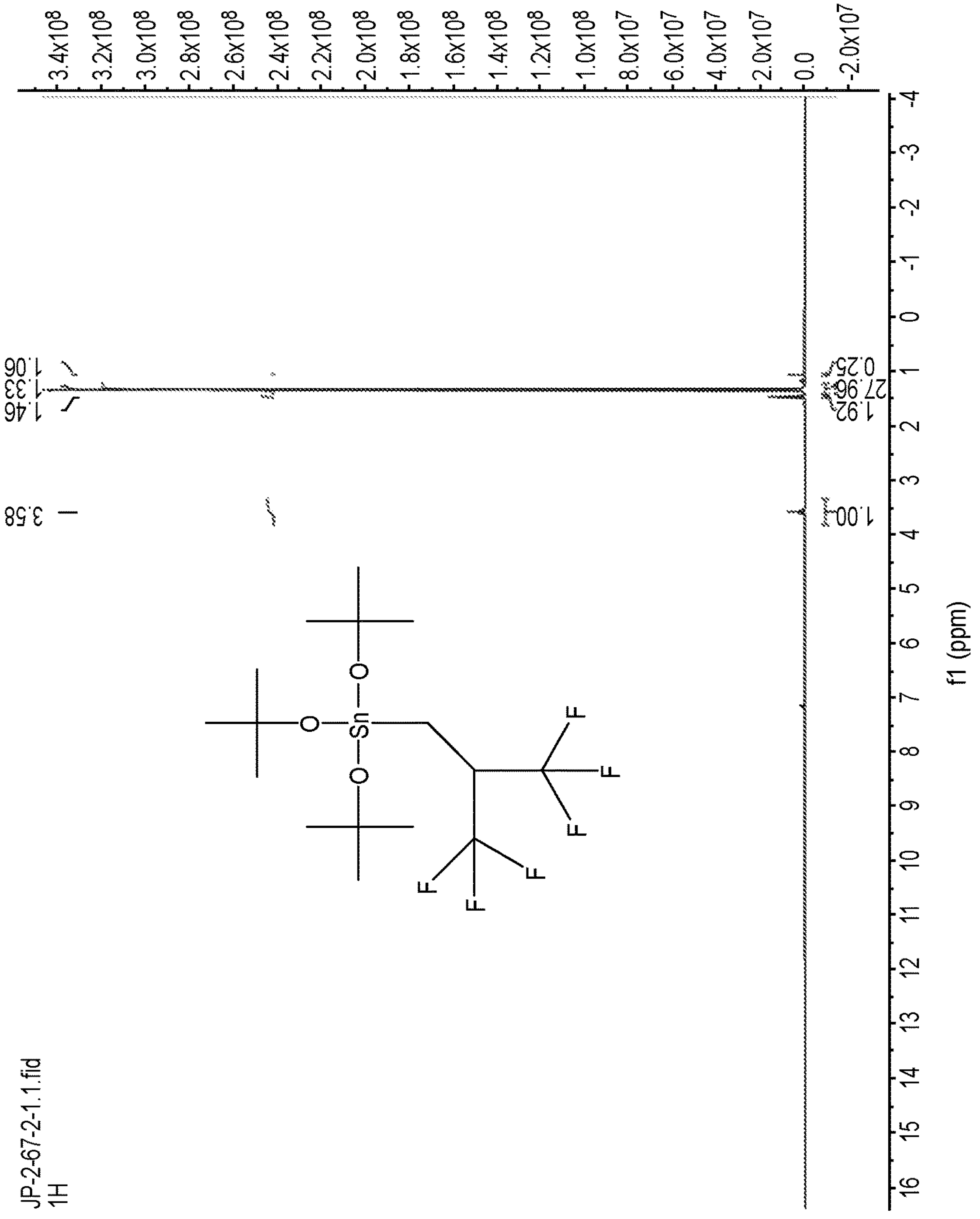
FIG. 21 is a $^1H$ NMR spectrum of 3,3,3,4,4,4-hexafluoroisobutyltin tris(tert-butyl oxide) (HFB).
Figure 22:
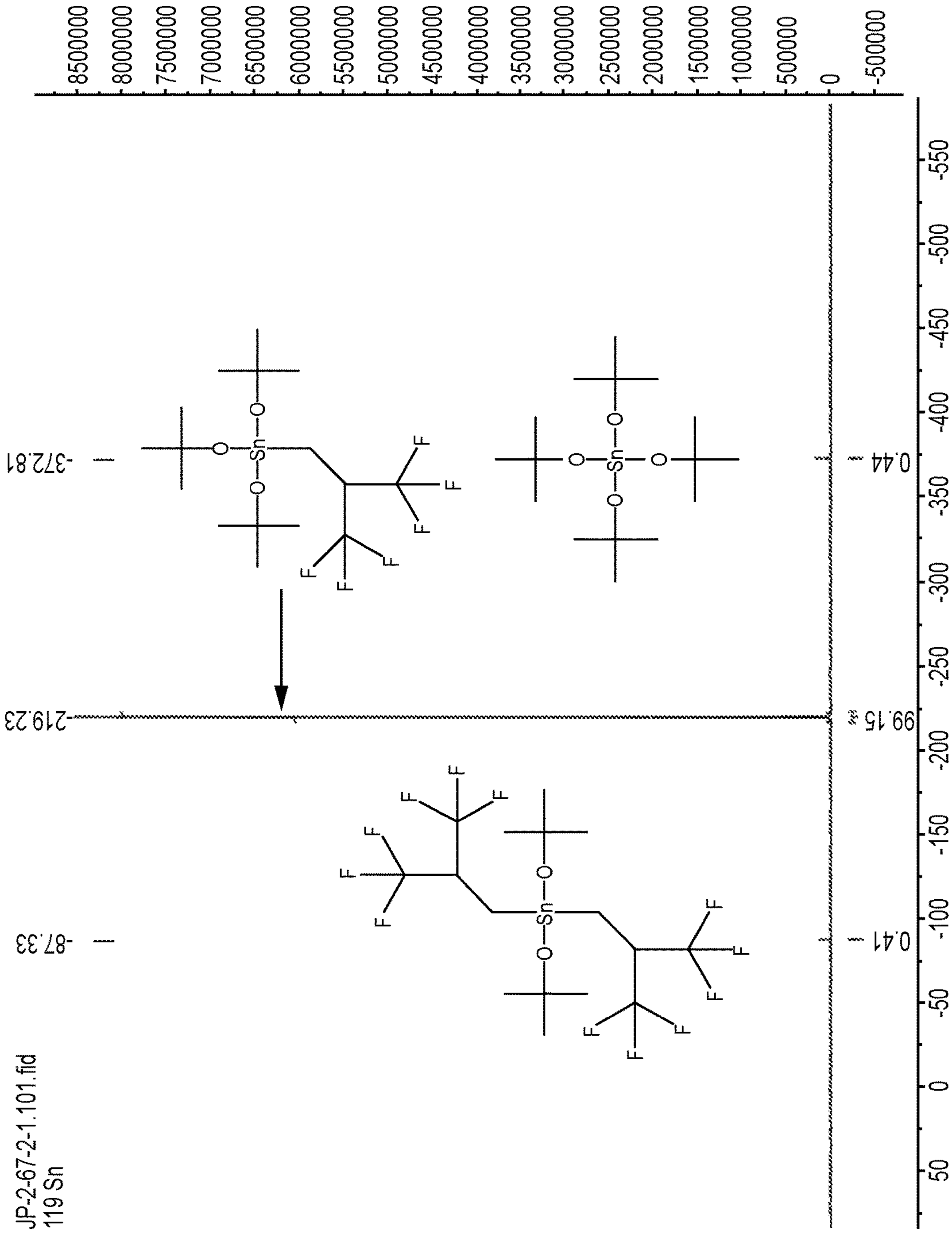
FIG. 22 is a $^{119}Sn$ NMR spectrum of 3,3,3,4,4,4-hexafluoroisobutyltin tris(tert-butyl oxide) (HFB).
Figure 23:
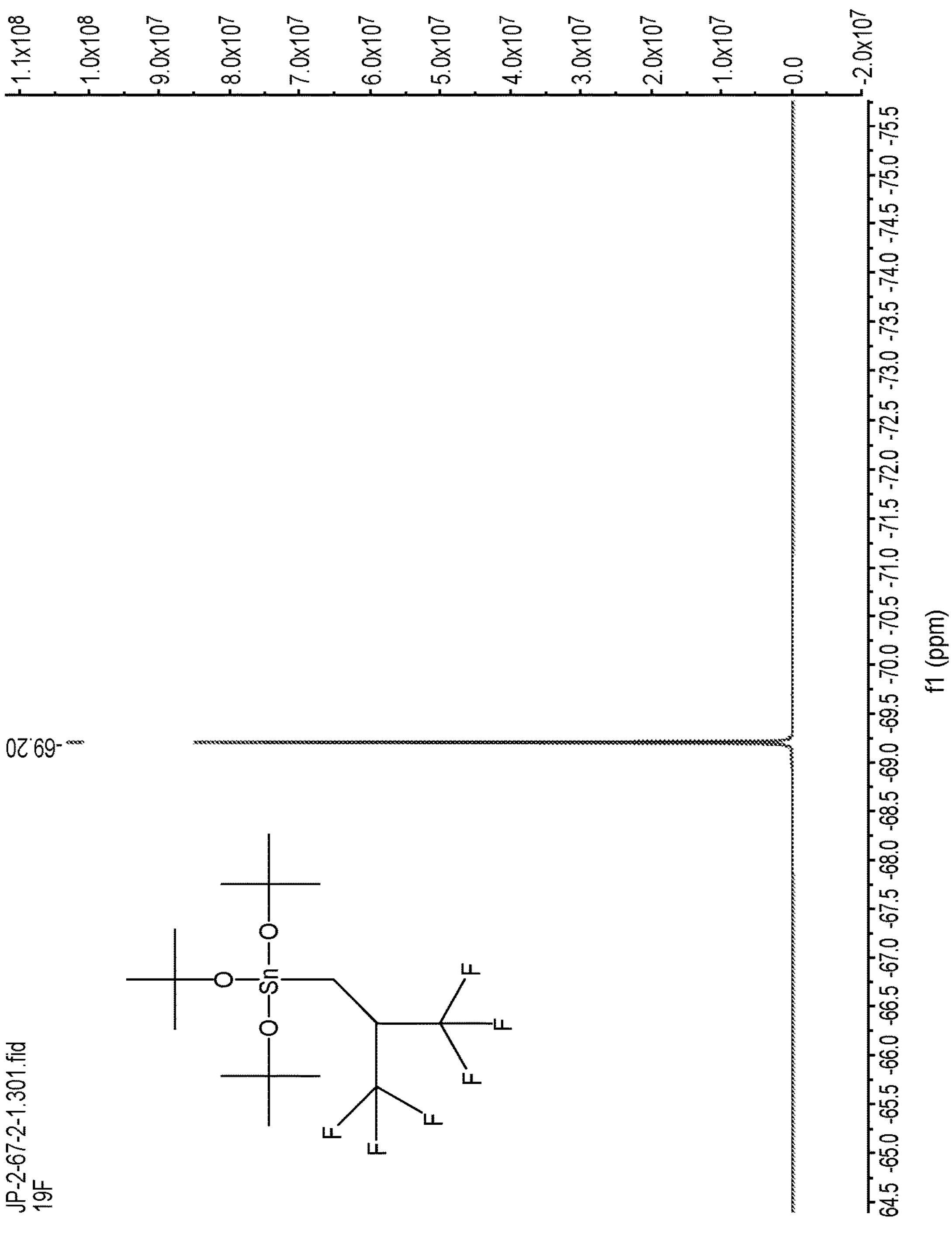
FIG. 23 is a $^{19}F$ NMR spectrum of 3,3,3,4,4,4-hexafluoroisobutyltin tris(tert-butyl oxide) (HFB).

FIG. 21 is the $^1H$ NMR spectrum of the product $(CF_3)_2CHCH_2Sn(OtBu)_3$, which shows the following chemical shifts: $^1H$ NMR (400 MHz, $C_6D_6$) δ 3.58 (m, $^1H$), 1.46 (d, 2H), 1.33 (2, 27H), 1.06 (s, 27H) ppm. FIG. 22 is the $^{119}Sn$ NMR (149 MHz, $C_6D_6$) spectrum of the product $(CF_3)_2CHCH_2Sn(OtBu)_3$, which shows a major peak at δ −219.23, corresponding to the product compound $(CF_3)_2CHCH_2Sn(OtBu)_3$, and minor peaks at δ −372.81 and δ −87.33, corresponding to a dialkyltin impurity and tin tetraalkoxide impurity, respectively. The high integration value of the product versus the impurities indicates a high purity $(CF_3)_2CHCH_2Sn(OtBu)_3$ product. FIG. 23 is the $^{19}F$ NMR spectrum of the product $(CF_3)_2CHCH_2Sn(OtBu)_3$, which shows a single sharp peak: $^{19}F$ NMR (376 MHz, neat) δ −69.2 ppm. The $^{19}NMR$ results indicate a single fluorine environment.

This example demonstrates a photochemical method for directly synthesizing a polyfluorinated organotin trialkoxide with high mono-organo specificity.

Example 10. UV-Based Synthesis of 4,5,5,5,6,6,6-heptafluoropentyltin tris(tert-butyl oxide) (HFP)

This example describes a method for the one-pot, direct synthesis of a fluorinated organo tin trialkoxide under UV light. The method is based on the following reaction.

$$Sn_2(OtBu)_4 + (CF_3)_2CF(CH_2)_2I \longrightarrow (CF_3)_2CF(CH_2)_2Sn(OtBu)_3$$

(Formula 4)

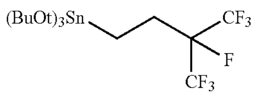

The method of Example 9 is followed with the exception of performing the reaction with $(CF_3)_2CF(CH_2)_2I$ instead of $(CF_3)_2CHCH_2I$. The resulting filtrate is distilled to afford the final product $(CF_3)_2CF(CH_2)_2Sn(OtBu)_3$ (4,5,5,5,6,6,6-heptafluoropentyltin tris(tert-butyl oxide) or HFP), as represented by Formula 4.

This example describes a photochemical method for directly synthesizing a polyfluorinated organotin trialkoxide with an expected high mono-organo specificity.

Further Inventive Concepts

A1. A method for synthesizing a monoorgano tin trialkoxide, the method comprising:
reacting $Sn_2(OR')_4$ with RX under ultraviolet light to form $RSn(OR')_3$, where X is Cl, Br or I; R is an organo group with 1 to 31 carbon atoms and forming a C—Sn bond; and R' is an organo group with 1 to 10 carbon atoms, wherein the organo groups can optionally comprise hetero-atoms and/or unsaturated bonds.

A2. The method of inventive concept A1 wherein R comprises a fluorine atom.

A3. The method of inventive concept A1 wherein R comprises a $—CF_3$ group.

A4. The method of inventive concept A1 wherein the ultraviolet light has a wavelength from about 315 nm to about 400 nm.

A5. The method of inventive concept A1 wherein R' is a methyl, an ethyl, a propyl, an i-propyl, a t-butyl, an i-butyl, or a t-amyl group.

A6. The method of inventive concept A1 further comprising filtering reaction products to remove $Sn_2X_2(OR')_2$ precipitated side products.

A7. The method of inventive concept A1 wherein reacting is performed at a temperature from about −20° C. to about 80° C.

B. An organometallic compound represented by the formula $((R'O)_3Sn)_n—R$, where n≥3, R' is an organo group with 1 to 10 carbon atoms and R is an organo group with 5 to 31 carbon atoms and forms a C—Sn bond with each Sn atom.

B1. The organometallic compound of inventive concept B wherein n is 3.

B2. The organometallic compound of inventive concept B wherein R comprises one or more fluorine atoms.

B3. The organometallic compound of inventive concept B wherein R comprises an unsaturated group.

B4. The organometallic compound of inventive concept B wherein R comprises an aromatic group.

B5. The organometallic compound of inventive concept B wherein R' is a methyl, ethyl, propyl, i-propyl, t-butyl, i-butyl, or t-amyl group.

B6. The organometallic compound of inventive concept B wherein the compound comprises 1,3,5-tris-(methyltin tris(tert-butyl oxide))benzene.

B7. A solution comprising an organic solvent and the organometallic compound of inventive concept B.

B8. The solution of inventive concept B7 wherein the organic solvent comprises an alcohol, an aromatic hydrocarbon, an aliphatic hydrocarbon, an ester, an ether, a ketone, or combinations thereof, and wherein the solution has a concentration from about 0.0025 M to about 1.4 M based on tin concentration.

B9. The solution of inventive concept B7 wherein the organic solvent comprises a primary alcohol.

B10. The solution of inventive concept B7 wherein the organic solvent comprises an aromatic solvent.

B11. The solution of inventive concept B7 further comprising a second organometallic composition represented by the formula $R^aSnL_3$ and distinct from the organometallic compound, wherein L is a hydrolysable ligand and $R^a$ is an organo group with 1 to 31 carbon atoms and forming a C—Sn bond.

B12. A structure comprising a radiation patternable film and a substrate wherein the film comprises the organometallic compound of inventive concept B and/or a hydrolysis product of the organometallic compound of inventive concept B.

B13. A structure comprising a radiation patternable film and a substrate wherein the film is formed from the compound of inventive concept B and comprises Sn—C bonds.

B14. The structure of inventive concept B13 wherein the film further comprises Sn—O—Sn and Sn—OH bonds.

C1. A method for forming a fluorinated organometallic compound represented by the formula $(CF_3)RSn(OR')_3$, where R is an organo group with 1 to 31 carbon atoms and forming a C—Sn bond; and R' is an organo group with 1 to 10 carbon atoms, the method comprising:

reacting $(CF_3)RX$ with $Sn_2(OR')_4$ or $MSn(OR')_3$ under visible or ultraviolet light where X is Cl, Br or I.

C2. The method of inventive concept C1 wherein the method comprises reacting $(CF_3)RX$ with $Sn_2(OR')_4$ under UV light.

C3. The method of inventive concept C1 wherein the method comprises reacting $(CF_3)RX$ with $MSn(OR')_3$ under visible light.

C4. The method of inventive concept C1 wherein X is I.

C5. The method of inventive concept C1 wherein X is Br.

C6. The method of inventive concept C1 wherein R is a $CH_2$ group.

C7. The method of inventive concept C1 wherein R is a $CR^1R^2$ group, where $R^1$ and/or $R^2$ is a halogenated organo group with 1 to 5 carbon atoms.

C8. The method of inventive concept C1 wherein R comprises a C═C group.

C9. The method of inventive concept C1 wherein R' is a methyl, an ethyl, a propyl, an i-propyl, at-butyl, an i-butyl, or a t-amyl group.

C10. The method of inventive concept C1 wherein the visible light is monochromatic.

C11. The method of inventive concept C1 wherein the visible light comprises purple, blue, or green light.

C12. The method of inventive concept C1 wherein the ultraviolet light has a wavelength from about 315 nm to about 400 nm.

C13. The method of inventive concept C1 wherein the visible or ultraviolet light is provided with an LED.

C14. The method of inventive concept C1 wherein reacting is performed for less than about 2 days.

C15. The method of inventive concept C1 wherein reacting is performed at a temperature from about −20° C. to about 80° C.

D. A fluorinated organometallic compound represented by the formula $(CF_3)_2R^1C—R^0Sn(OR')_3$, where $R^0$ is an organo group with 1 to 31 carbon atoms and forming a C—Sn bond; $R^1$ is hydrogen, a halogen atom or an organo group with 1 to 10 carbon atoms; and R' is an organo group with 1 to 10 carbon atoms.

D1. The fluorinated organometallic compound of inventive concept D wherein $R^1$ is F.

D2. The fluorinated organometallic compound of inventive concept D wherein $R^1$ comprises a $CF_3$ group.

D3. The fluorinated organometallic compound of inventive concept D wherein $R^1$ is a hydrogen.

D4. The fluorinated organometallic compound of inventive concept D wherein R' is a methyl, ethyl, propyl, i-propyl, t-butyl, i-butyl, or t-amyl group.

D5. The fluorinated organometallic compound of inventive concept D wherein $R^0$ is $(CH_2)_n$ and wherein n is from 1 to 4.

D6. A solution comprising an organic solvent and the fluorinated organometallic compound of inventive concept D.

D7. The solution of inventive concept D6 wherein the organic solvent comprises an alcohol, an aromatic hydrocarbon, an aliphatic hydrocarbon, an ester, an ether, a ketone, or combinations thereof, and wherein the solution has a concentration from about 0.0025M to about 1.4M based on tin concentration.

D8. The solution of inventive concept D6 wherein the organic solvent comprises a primary alcohol.

D9. The solution of inventive concept D6 further comprising a second organometallic composition represented by the formula $R^aSnL_3$ and distinct from the fluorinated organometallic compound, wherein L is a hydrolysable ligand and $R^a$ is an organo group with 1 to 31 carbon atoms and forming a C—Sn bond.

D10. A structure comprising a radiation patternable film and a substrate wherein the film comprises the fluorinated organometallic compound of claim D and/or a hydrolysis product of the fluorinated organometallic compound of inventive concept D.

D11. A structure comprising a radiation patternable film and a substrate wherein the film is formed from the compound of inventive concept D and comprises Sn—C bonds.

D12. The structure of inventive concept D11 wherein the film further comprises Sn—O—Sn and Sn—OH bonds.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term “about” herein refers to expected uncertainties in the associated values as would be understood in the particular context by a person of ordinary skill in the art.

What is claimed is:

1. A method for synthesizing a monoorgano tin trialkoxide, the method comprising reacting $MSn(OR')_3$ with $RX_n$ to form $R[Sn(OR')_3]_n$, wherein M is Li, Na, K, Rb, or Cs; X is Cl, Br or I; $n \geq 1$, R is an organo group with 1 to 31 carbon atoms and forming a C—Sn bond; and R' is an organo group with 1 to 10 carbon atoms, wherein the organo groups can optionally comprise hetero-atoms and/or unsaturated bonds.

2. The method of claim 1 wherein n=1.

3. The method of claim 2 wherein R comprises one or more fluorine atoms.

4. The method of claim 2 wherein R comprises a C═C group.

5. The method of claim 1 wherein n=2.

6. The method of claim 5 wherein R comprises 3 to 12 carbon atoms.

7. The method of claim 5 wherein R comprises an unsaturated group.

8. The method of claim 1 wherein n=3.

9. The method of claim 8 wherein R comprises an aromatic group.

10. The method of claim 1 wherein X is Br or I and M is K.

11. The method of claim 1 wherein reacting is performed for less than about 2 days.

12. The method of claim 1 wherein reacting is performed at a temperature from about −20° C. to about 100° C.

13. The method of claim 1 wherein reacting is performed with a quaternary ammonium catalyst and/or a phosphonium catalyst.

14. The method of claim 13 wherein the catalyst is a tetrabutylammonium halide.

15. The method of claim 14 wherein the halide in the tertrabutylammonium halide is I.

16. The method of claim 1 wherein reacting is performed under a directed visible or ultraviolet light source.

17. The method of claim 16 wherein the light source is monochromatic.

18. The method of claim 1 further comprising purifying the $R[Sn(OR')_3]_n$ product using distillation.

19. The method of claim 1 further comprising purifying the $R[Sn(OR')_3]_n$ product using sublimation.

20. The method of claim 1 wherein the $MSn(OR')_3$ is formed by reacting $SnX'_2$ with MOR', where X' is Cl, Br or I and $MSn(OR')_3$ is used for reacting with $RX_n$ without isolation.

21. The method of claim 1 wherein the carbon bonded to Sn is a primary carbon bond or a secondary carbon.

* * * * *